(12) United States Patent
Anderson et al.

(10) Patent No.: US 11,537,816 B2
(45) Date of Patent: Dec. 27, 2022

(54) EXTRACTION OF GENEALOGY DATA FROM OBITUARIES

(71) Applicant: Ancestry.com Operations Inc., Lehi, UT (US)

(72) Inventors: Carol Myrick Anderson, Lehi, UT (US); Gann Bierner, Lehi, UT (US); Philip Theodore Crone, Lehi, UT (US); Tyler Folkman, Lehi, UT (US)

(73) Assignee: Ancestry.com Operations Inc., Lehi, UT (US)

( * ) Notice: Subject to any disclaimer, the term of this patent is extended or adjusted under 35 U.S.C. 154(b) by 352 days.

(21) Appl. No.: 16/928,903

(22) Filed: Jul. 14, 2020

(65) Prior Publication Data
US 2021/0019569 A1    Jan. 21, 2021

Related U.S. Application Data

(60) Provisional application No. 62/874,689, filed on Jul. 16, 2019.

(51) Int. Cl.
*G06K 9/00* (2022.01)
*G06K 9/62* (2022.01)
(Continued)

(52) U.S. Cl.
CPC ......... *G06K 9/6257* (2013.01); *G06F 16/288* (2019.01); *G06F 16/55* (2019.01);
(Continued)

(58) Field of Classification Search
CPC ........ G06V 20/20; G06V 20/35; G06V 10/82; G06V 20/36; G06V 20/70;
(Continued)

(56) References Cited

U.S. PATENT DOCUMENTS

| 7,720,846 B1 | 5/2010 | Bayliss | |
| 8,930,178 B2* | 1/2015 | Pestian | G16H 70/60 704/10 |
| 9,245,205 B1* | 1/2016 | Soldevila | G06V 10/464 |
| 9,348,815 B1* | 5/2016 | Estes | G06F 40/30 |
| 10,733,375 B2* | 8/2020 | Li | G06F 40/211 |
| 2003/0182310 A1* | 9/2003 | Charnock | G06Q 10/10 |

(Continued)

FOREIGN PATENT DOCUMENTS

| CA | 3066534 A1 * | 4/2019 | G06K 9/6267 |
| CA | 3104549 A1 * | 12/2019 | G02B 30/52 |

(Continued)

OTHER PUBLICATIONS

International Search Report and Written Opinion dated Oct. 30, 2020 in related foreign application No. PCT/US2020/042045, all pgs.

*Primary Examiner* — Mahendra R Patel
(74) *Attorney, Agent, or Firm* — Kilpatrick Townsend & Stockton LLP

(57) ABSTRACT

Systems, methods, and other techniques for extracting data from obituaries are provided. In some embodiments, an obituary containing a plurality of words is received. Using a machine learning model, an entity tag from a set of entity tags may be assigned to each of one or more words of the plurality of words. Each particular tag from the set of entity tags may include a relationship component and a category component. The relationship component may indicate a relationship between a particular word and the deceased individual. The category component may indicate a categorization of the particular word to a particular category from a set of categories. The extracted data may be stored in a genealogical database.

17 Claims, 17 Drawing Sheets

(51) Int. Cl.
*G06F 16/55* (2019.01)
*G06F 16/58* (2019.01)
*G06F 40/30* (2020.01)
*G06N 20/00* (2019.01)
*G06F 40/295* (2020.01)
*G06F 16/28* (2019.01)
*G06V 10/70* (2022.01)

(52) U.S. Cl.
CPC ........ *G06F 16/5866* (2019.01); *G06F 40/295* (2020.01); *G06F 40/30* (2020.01); *G06N 20/00* (2019.01); *G06V 10/768* (2022.01)

(58) Field of Classification Search
CPC ............ G06V 30/19173; G06V 30/274; G06F 16/5866; G06F 16/90332; G06F 40/35; G06F 40/30; G06N 3/0454; G06N 3/006; G06N 3/0445; G06N 3/08; G06N 5/02; G06N 20/10; H04L 51/02
USPC ......................................................... 382/152
See application file for complete search history.

(56) References Cited

U.S. PATENT DOCUMENTS

| | | | |
|---|---|---|---|
| 2006/0253418 A1 | 11/2006 | Charnock et al. | |
| 2007/0005653 A1* | 1/2007 | Marsh .................. | G11B 27/322 |
| 2009/0157382 A1* | 6/2009 | Bar ...................... | G06F 40/284 |
| | | | 707/999.102 |
| 2010/0094910 A1* | 4/2010 | Bayliss ................. | G06Q 10/10 |
| | | | 707/E17.096 |
| 2010/0205179 A1* | 8/2010 | Carson ................. | G06F 16/148 |
| | | | 707/E17.089 |
| 2015/0363481 A1* | 12/2015 | Haynes ................. | G06Q 10/10 |
| | | | 707/748 |
| 2018/0081871 A1* | 3/2018 | Williams .............. | G06F 16/31 |
| 2018/0203674 A1* | 7/2018 | Dayanandan ............ | G06F 8/35 |
| 2021/0004377 A1* | 1/2021 | Neumann ............. | G06F 16/252 |

FOREIGN PATENT DOCUMENTS

| | | | | |
|---|---|---|---|---|
| CN | 107341171 A | * | 11/2017 | ....... G06F 16/24522 |
| CN | 106897732 B | * | 10/2019 | ............ G06K 9/2063 |
| WO | WO-2019227068 A1 | * | 11/2019 | .......... G06F 11/3024 |

\* cited by examiner

PersonSelf
PersonChild
PersonParent
PersonSibling
PersonSpouse
PersonOther
AgeSelf
AgeOther
DateSelfBirth
DateChildBirth
DateParentBirth
DateSiblingBirth
DateSpouseBirth
DateOtherBirth
DateSelfDeath
DateChildDeath
DateParentDeath
DateSiblingDeath
DateSpouseDeath
DateOtherDeath
DateSelfBurial
DateChildBurial
DateParentBurial
DateSiblingBurial
DateSpouseBurial
DateOtherBurial
DateSelfMarriage
DateChildMarriage
DateParentMarriage
DateSiblingMarriage
DateSpouseMarriage
DateOtherMarriage
DateSelfResidence
DateChildResidence
DateParentResidence
DateSiblingResidence
DateSpouseResidence
DateOtherResidence
DateSelfOther
DateChildOther DateParentOther
DateSiblingOther
DateSpouseOther
DateOtherOther
PlaceSelfBirth
PlaceChildBirth
PlaceParentBirth
PlaceSiblingBirth
PlaceSpouseBirth
PlaceOtherBirth
PlaceSelfDeath
PlaceChildDeath
PlaceParentDeath
PlaceSiblingDeath
PlaceSpouseDeath
PlaceOtherDeath
PlaceSelfBurial
PlaceChildBurial
PlaceParentBurial
PlaceSiblingBurial
PlaceSpouseBurial
PlaceOtherBurial
PlaceSelfMarriage
PlaceChildMarriage
PlaceParentMarriage
PlaceSiblingMarriage
PlaceSpouseMarriage
PlaceOtherMarriage
PlaceSelfResidence
PlaceChildResidence
PlaceParentResidence
PlaceSiblingResidence
PlaceSpouseResidence
PlaceOtherResidence
PlaceSelfOther
PlaceChildOther
PlaceParentOther
PlaceSiblingOther
PlaceSpouseOther
PlaceOtherOther

Persons
Bride
BrideChild
BrideParent
BrideSibling
Groom
GroomChild
GroomParent
GroomSibling
Newlyweds
NewlywedsChild
NewlywedsParent
NewlywedsSibling
Spouse1
Spouse1Child
Spouse1Parent
Spouse1Sibling
Spouse2
Spouse2Child
Spouse2Parent
Spouse2Sibling
WeddingParty
Officiant
OtherPerson

Places
BrideResidence
GroomResidence
NewlywedsResidence
Spouse1Residence
Spouse2Residence
ResidencePlace
MarriagePlace
LicensePlace
CeremonyVenue
ReceptionVenue
HoneymoonPlace
OtherPlace

Dates
WeddingDate
LicenseDate
EngagementDate
GraduationDate
OtherDate

Ages
BrideAge
GroomAge
NewlywedsAge
Spouse1Age
Spouse2Age
OtherAge

Organizations
BrideEmployer
BrideSchool
GroomEmployer
GroomSchool
NewlywedsEmployer
NewlywedsSchool
Spouse1Employer
Spouse1School
Spouse2Employer
Spouse2School
OtherOrganization

Occupations
BrideOccupation
GroomOccupation
NewlywedsOccupation
Spouse1Occupation
Spouse2Occupation
OtherOccupation

Other
BrideAttire
GroomAttire
OtherAttire
Flowers
Song

Relations
ResidenceOf
GraduationDateSchool
GraduationDatePerson

EXTRACTION OF GENEALOGY DATA FROM OBITUARIES

CROSS-REFERENCES TO RELATED APPLICATIONS

This application claims the benefit of priority to U.S. Provisional Patent Application No. 62/874,689 filed Jul. 16, 2019, entitled "EXTRACTION OF GENEALOGY DATA FROM OBITUARIES," the contents of which are herein incorporated in their entirety.

BACKGROUND OF THE INVENTION

Genealogical databases can store genealogy data originating from a wide range of sources. One such source includes obituaries, which are news articles that report the death of an individual, typically along with a brief account of the individual's life and possibly information regarding the individual's funeral. Obituaries have historically been published in local newspapers upon the death of the individual. Information contained in obituaries can provide a valuable source of genealogical information as they often include names of family members as well as dates and locations of major life events. However, finding the obituary of a particular person and extracting information from this obituary once it is found remains a labor-intensive, manual process. No accurate, automated method is currently available to identify obituaries, extract facts from the text of these obituaries, and match them to individuals in a database. Accordingly, new systems, methods, and other techniques for extracting data from obituaries are needed.

BRIEF SUMMARY OF THE INVENTION

Examples given below provide a summary of the present invention. As used below, any reference to a series of examples is to be understood as a reference to each of those examples disjunctively (e.g., "Examples 1-4" is to be understood as "Examples 1, 2, 3, or 4").

Example 1 is a computer-implemented method for extracting data from obituaries, the method comprising: receiving an image; recognizing text in the image; determining that the image contains at least one obituary; segmenting the image into a plurality of sections; determining that a section of the plurality of sections contains an obituary of the at least one obituary, the obituary containing a plurality of words and corresponding to a deceased individual; and assigning, using an entity tagging machine learning (ML) model, an entity tag from a set of entity tags to each of one or more words of the plurality of words, wherein each particular entity tag from the set of entity tags includes a relationship component and a category component, wherein the relationship component indicates a relationship between a particular word of the plurality of words to which the particular entity tag is assigned and the deceased individual, and wherein the category component indicates a categorization of the particular word to a particular category from a set of categories; wherein, prior to assigning the entity tag, the entity tagging ML model is trained by: receiving a plurality of input words corresponding to an input obituary; creating a first training set based on the plurality of input words; training the entity tagging ML model in a first stage using the first training set; creating a second training set including a subset of the plurality of input words to which entity tags were incorrectly assigned after the first stage; and training the entity tagging ML model in a second stage using the second training set.

Example 2 is the computer-implemented method of example(s) 1, wherein the entity tagging ML model is a neural network.

Example 3 is the computer-implemented method of example(s) 1-2, wherein the relationship component is selected from the group comprising: SELF, SPOUSE, CHILD, SIBLING, and PARENT.

Example 4 is the computer-implemented method of example(s) 1-3, wherein the category component is selected from the group comprising: PERSON, PLACE, DATE, and AGE.

Example 5 is the computer-implemented method of example(s) 1-4, further comprising: predicting, using a gender prediction ML model, a gender for each of the plurality of words for which the category component of the particular entity tag that is assigned is PERSON.

Example 6 is the computer-implemented method of example(s) 1-5, further comprising: assigning, using a name assignment ML model, a name part tag from a set of name part tags to each of the plurality of words for which the category component of the particular entity tag that is assigned is PERSON, wherein the set of name part tags at least includes GIVEN NAME, SURNAME, and MAIDEN NAME.

Example 7 is a computer-implemented method for extracting data from obituaries, the method comprising: receiving an obituary containing a plurality of words, the obituary corresponding to a deceased individual; assigning, using an entity tagging ML model, an entity tag from a set of entity tags to each of one or more words of the plurality of words, wherein each particular entity tag from the set of entity tags includes a relationship component and a category component, wherein the relationship component indicates a relationship between a particular word of the plurality of words to which the particular entity tag is assigned and the deceased individual, and wherein the category component indicates a categorization of the particular word to a particular category from a set of categories.

Example 8 is the computer-implemented method of example(s) 7, wherein the entity tagging ML model is a neural network.

Example 9 is the computer-implemented method of example(s) 7-8, wherein the relationship component is selected from the group comprising: SELF, SPOUSE, CHILD, SIBLING, and PARENT.

Example 10 is the computer-implemented method of example(s) 7-9, wherein the category component is selected from the group comprising: PERSON, PLACE, DATE, and AGE.

Example 11 is the computer-implemented method of example(s) 7-10, further comprising: receiving an image; segmenting the image into a plurality of sections; and determining that a section of the plurality of sections contains the obituary.

Example 12 is the computer-implemented method of example(s) 7-11, further comprising: recognizing text in the image.

Example 13 is the computer-implemented method of example(s) 7-12, wherein, prior to assigning the entity tag, the entity tagging ML model is trained by: receiving an input obituary containing a plurality of input words; creating a first training set based on the plurality of input words; training the entity tagging ML model in a first stage using the first training set; creating a second training set including a subset of the plurality of input words to which entity tags were incorrectly assigned after the first stage; and training the entity tagging ML model in a second stage using the second training set.

Example 14 is the computer-implemented method of example(s) 7-13, further comprising: predicting, using a gender prediction ML model, a gender for each of the plurality of words for which the category component of the particular entity tag that is assigned is PERSON.

Example 15 is the computer-implemented method of example(s) 7-14, further comprising: assigning, using a name assignment ML model, a name part tag from a set of name part tags to each of the plurality of words for which the category component of the particular entity tag that is assigned is PERSON, wherein the set of name part tags at least includes GIVEN NAME and SURNAME.

Example 16 is a non-transitory computer-readable medium comprising instructions that, when executed by one or more processors, cause the one or more processors to perform operations comprising: receiving an obituary containing a plurality of words, the obituary corresponding to a deceased individual; assigning, using an entity tagging ML model, an entity tag from a set of entity tags to each of one or more words of the plurality of words, wherein each particular entity tag from the set of entity tags includes a relationship component and a category component, wherein the relationship component indicates a relationship between a particular word of the plurality of words to which the particular entity tag is assigned and the deceased individual, and wherein the category component indicates a categorization of the particular word to a particular category from a set of categories.

Example 17 is the non-transitory computer-readable medium of example(s) 16, wherein the entity tagging ML model is a neural network.

Example 18 is the non-transitory computer-readable medium of example(s) 16-17, wherein the relationship component is selected from the group comprising: SELF, SPOUSE, CHILD, SIBLING, and PARENT.

Example 19 is the non-transitory computer-readable medium of example(s) 16-18, wherein the category component is selected from the group comprising: PERSON, PLACE, DATE, and AGE.

Example 20 is the non-transitory computer-readable medium of example(s) 16-19, wherein, prior to assigning the entity tag, the entity tagging ML model is trained by: receiving an input obituary containing a plurality of input words; creating a first training set based on the plurality of input words; training the entity tagging ML model in a first stage using the first training set; creating a second training set including a subset of the plurality of input words to which entity tags were incorrectly assigned after the first stage; and training the entity tagging ML model in a second stage using the second training set.

BRIEF DESCRIPTION OF THE DRAWINGS

The accompanying drawings, which are included to provide a further understanding of the invention, are incorporated in and constitute a part of this specification, illustrate embodiments of the invention and together with the detailed description serve to explain the principles of the invention. No attempt is made to show structural details of the invention in more detail than may be necessary for a fundamental understanding of the invention and various ways in which it may be practiced.

FIGS. 4A and 4B illustrate example entity tags that may be assigned to words of an article.

In the appended figures, similar components and/or features may have the same numerical reference label. Further, various components of the same type may be distinguished by following the reference label with a letter or by following the reference label with a dash followed by a second numerical reference label that distinguishes among the similar components and/or features. If only the first numerical reference label is used in the specification, the description is applicable to any one of the similar components and/or features having the same first numerical reference label irrespective of the suffix.

DETAILED DESCRIPTION OF THE INVENTION

Embodiments of the present disclosure provide for systems, methods, and other techniques for identifying articles, such as obituaries and wedding announcements, and extracting entities and relationships from the text so as to match the articles to individuals in a genealogical database. Such techniques may be applied to various sources of obituaries and wedding announcements. As one example, in some embodiments of the present disclosure, a collection of images of newspaper pages are provided. As another example, in some embodiments of the present disclosure, a collection of text-only articles scraped from the Internet are provided.

Regardless of the source of the articles, a variety of categories of entities may be extracted from each article, including persons, places, dates, and ages. Additionally, each entity may be categorized into a more granular type which may describe the relationship between the entity and the deceased person. In some embodiments, for the person entity category, a prediction of the gender is also made.

While several embodiments of the present disclosure are described in reference to obituaries, various embodiments may include a wide variety of applications in which data (e.g., genealogy data) is to be extracted from the text of a historical document. For example, embodiments of the present disclosure may be used to extract data from marriage announcements, documents regarding sporting events, weather reports, foreign exchange rates, stock prices, music charts, ship docking reports, graduation lists, birth notices, book bestseller lists, and the like.

Figure 1:
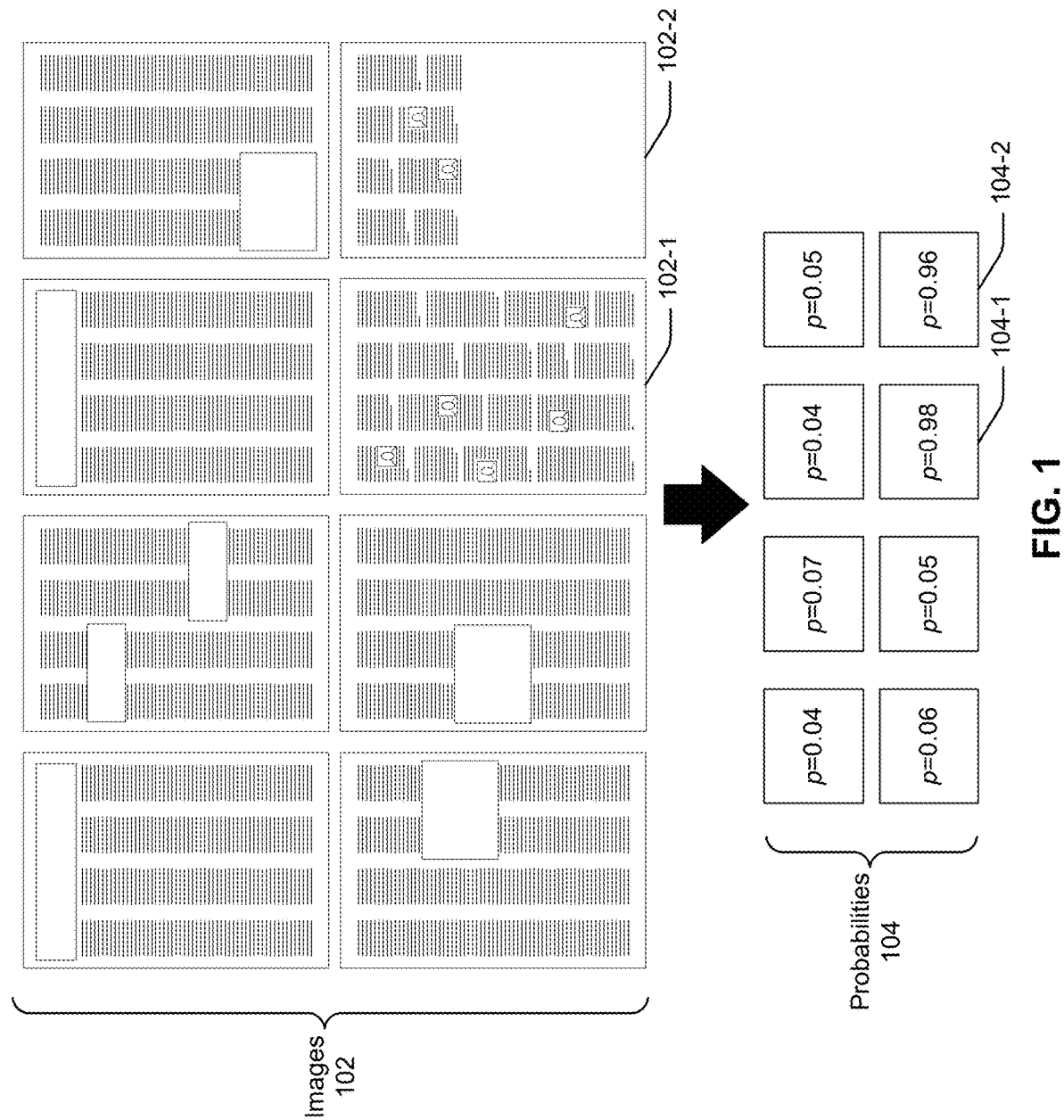
FIG. 1 illustrates an example of various images and the probabilities that a particular image contains an obituary.

FIG. 1 illustrates an example of various images 102 and probabilities 104 that a particular image contains an obituary, according to some embodiments of the present disclosure. Images 102 may be retrieved from a source, such as a newspaper. In some embodiments, a machine learning (ML) model is trained and subsequently used to determine whether each of images 102 includes an obituary by generating probabilities 104. In some embodiments, each of probabilities 104 is compared to a threshold (for example, 0.90). Images 102 having a probability greater than the threshold may be determined to include an obituary. For example, because probabilities 104-1, 104-2 are greater than the threshold, images 102-1, 102-2 may be determined to include obituaries.

Figure 2:
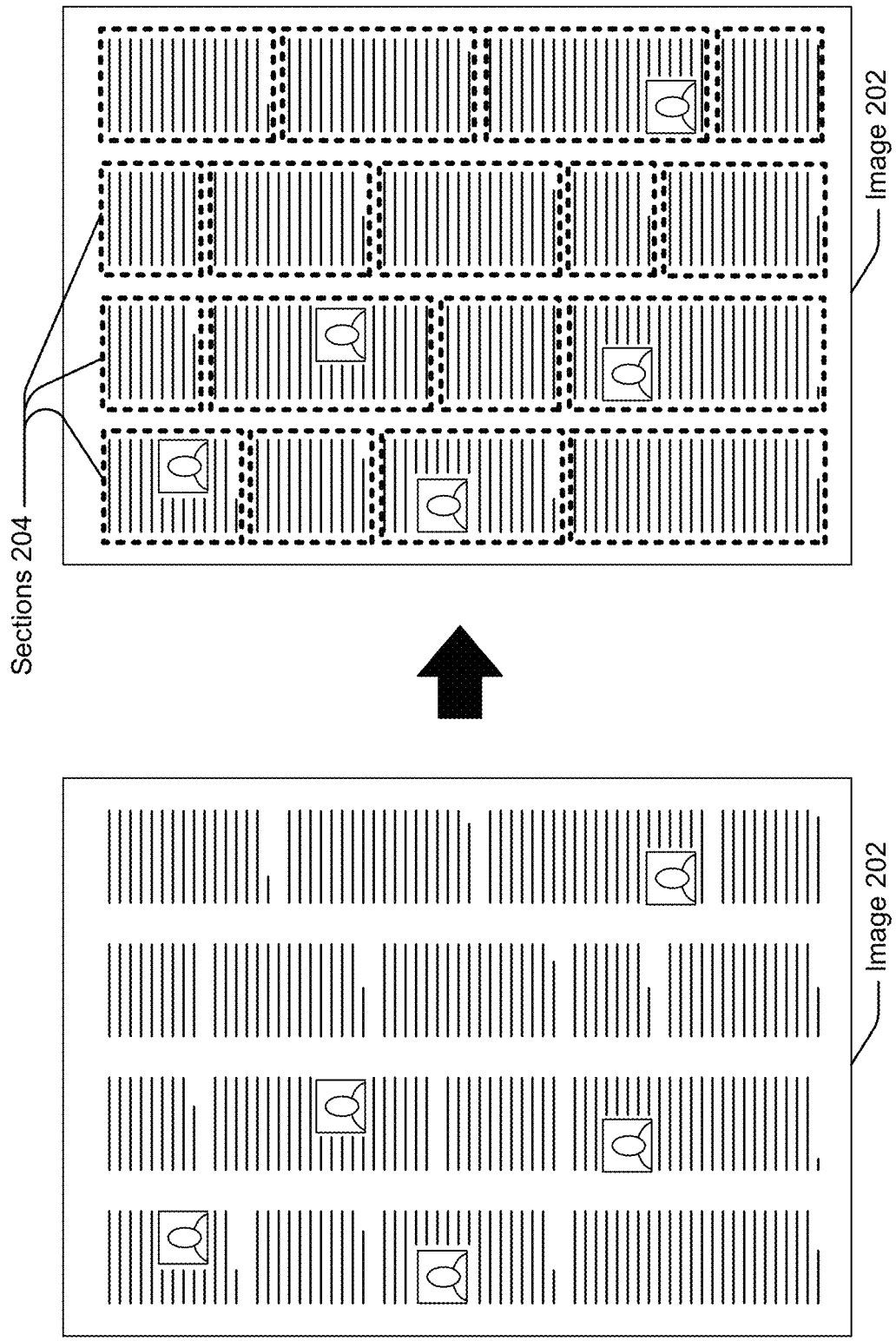
FIG. 2 illustrates an example of an image that is segmented into multiple sections.

FIG. 2 illustrates an example of an image 202 that is segmented into multiple sections 204, according to some embodiments of the present disclosure. In some embodiments, an ML model is trained and subsequently used to segment image 202 into sections 204. In some embodiments, each of sections 204 may contain a different obituary. In some embodiments, image segmentation is performed as an object detection task, where the objects to be detected are sections and/or headings in image 202.

Figure 3:
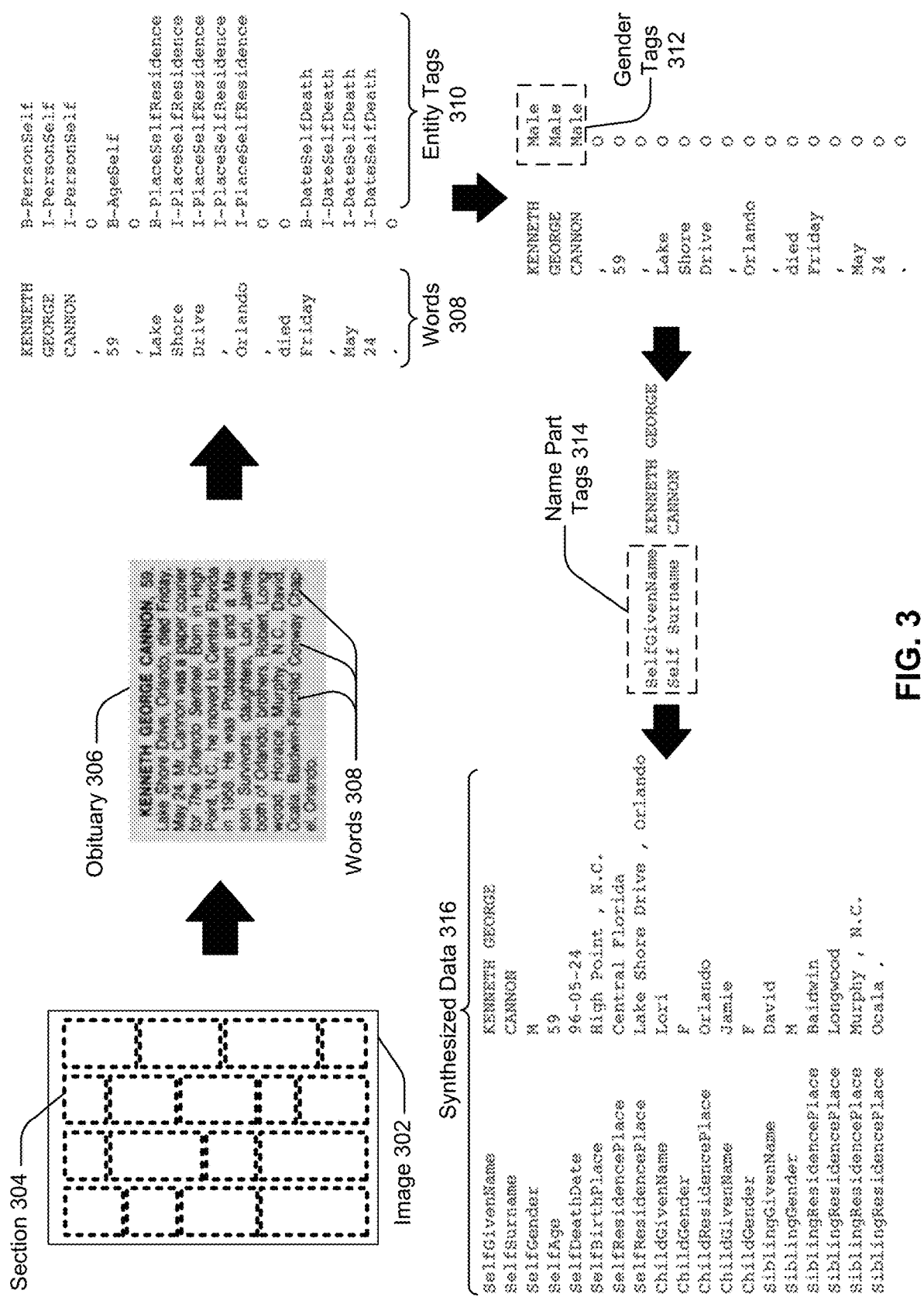
FIG. 3 illustrates various example steps for extracting data from an article.

FIG. 3 illustrates various example steps for extracting data from an article, such as an obituary 306, according to some embodiments of the present disclosure. In some embodiments, a section 304 of an image 302 may be analyzed to determine that section 304 contains obituary 306 comprising multiple words 308. Words 308 may be analyzed by an ML model to assign entity tags 310 to one or more of words 308. Each of entity tags 310 may include a relationship component and a category component. In some embodiments, the relationship component may indicate a relationship between the word and the deceased individual. For example, the entity tag "PersonSelf" may include the relationship component "Self" indicating that the word to which the entity tag is assigned corresponds to the deceased individual himself. As another example, the entity tag "AgeChild" may include the relationship component "Child" indicating that the word to which the entity tag is assigned corresponds to the deceased individual's child. Examples of relationship components include, but are not limited to: "Self", "Spouse", "Child", "Sibling", and "Parent".

In some embodiments, the category component may indicate a categorization of the word to a category from a set of categories. For example, the entity tag "PersonSelf" may include the category component "Person" indicating that the word to which the entity tag is assigned corresponds to a name of a person. As another example, the entity tag "AgeChild" may include the category component "Age" indicating that the word to which the entity tag is assigned corresponds to an age of a person. Examples of category components include, but are not limited to: "Person", "Place", "Date", and "Age". In some embodiments, different category components can vary in their level of specificity. For example, different category components may include sub-categories such as "Date-Birth", "Date-Death", "Date-Burial", "Date-Marriage", "Date-Residence", "Place-Birth", "Place-Death", "Place-Burial", "Place-Marriage", "Place-Residence", and the like.

In some embodiments, gender tags 312 may be assigned to each of words 308 for which an entity tag was assigned having a category component of "Person". For example, words 308 may be analyzed by an ML model to assign gender tags 312 to one or more of words 308. Examples of gender tags 312 include "Male", "Female", "Unknown", and "Other".

In some embodiments, name part tags 314 may be assigned to each of words 308 for which an entity tag was assigned having a category component of "Person". For example, words 308 may be analyzed by an ML model to assign name part tags 314 to one or more of words 308. Examples of name part tags 314 include "Given Name", "Surname", "Maiden Name", and "Suffix". The resulting data from assigning entity tags 310, gender tags 312, and name part tags 314 may be summarized and/or synthesized to create synthesized data 316, which may be stored in a genealogical database.

FIGS. 4A and 4B illustrate example entity tags 400 that may be assigned to words of an article, according to some embodiments of the present disclosure. Specifically, entity tags 400A may be assigned to words of an obituary and entity tags 400B may be assigned to words of a marriage announcement. Each of entity tags 400 may include a relationship component and a category component.

Figure 5:
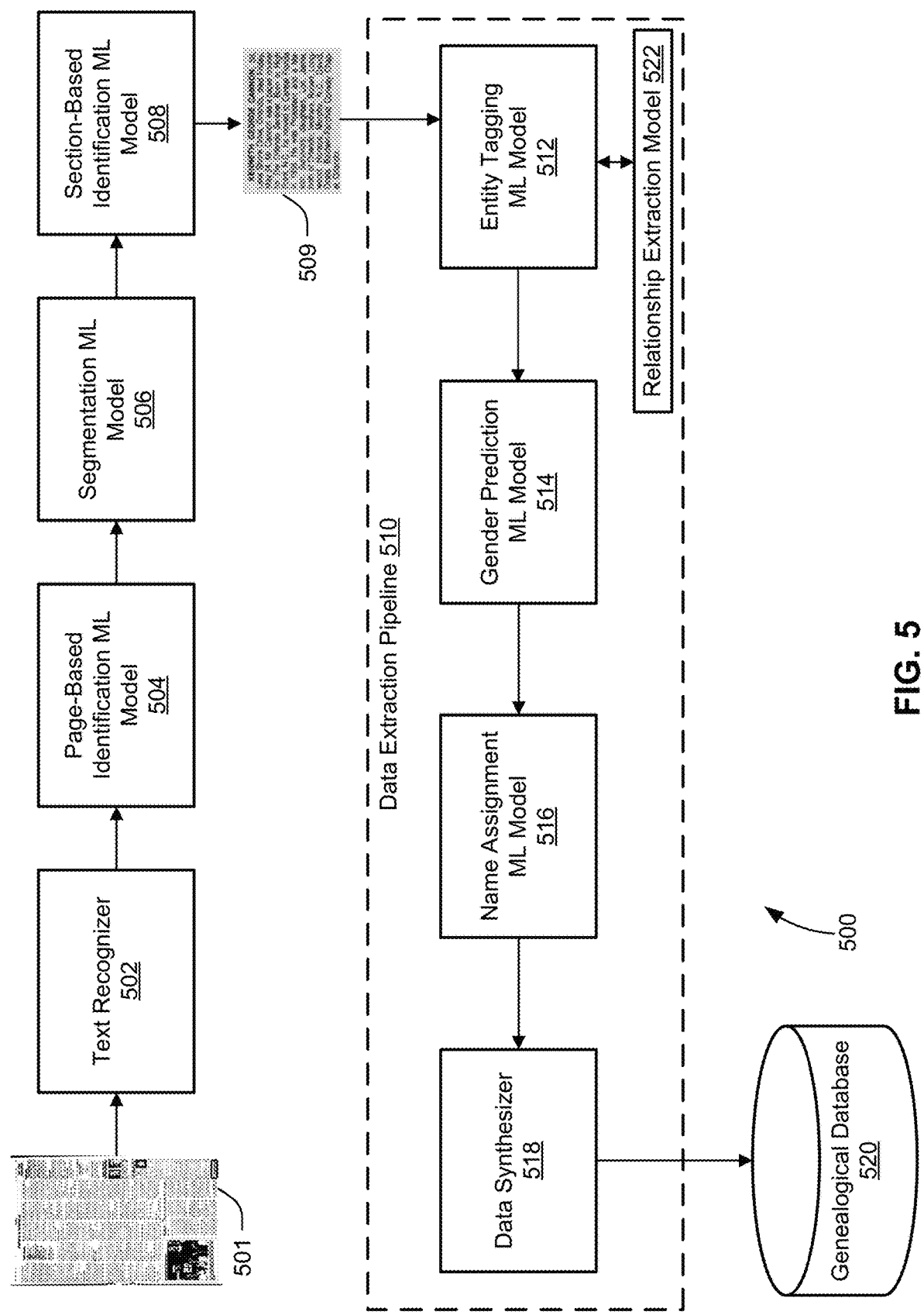
FIG. 5 illustrates a system for extracting data from articles such as obituaries.

FIG. 5 illustrates a system 500 for extracting data from articles such as obituaries, according to some embodiments of the present disclosure. In some embodiments, an image 501 (e.g., an image of a page of a newspaper) is received by system 500. The text in image 501 may then be recognized by a text recognizer 502. In some embodiments, text recognizer 502 is implemented by optical character recognition (OCR) software. Text recognizer 502 may output the text in image 501 and the X- and Y-coordinates of each word in the text. In some embodiments, text recognizer 502 additionally outputs image 501.

In some embodiments, system 500 includes a page-based identification ML model 504 for determining whether image 501 contains at least one article such as an obituary. In some embodiments, the output of page-based identification ML model 504 is a binary output (e.g., yes or no). In some embodiments, the output is a probability indicating a likelihood that image 501 contains at least one obituary. In some embodiments, the probability may be compared to a threshold. If the probability is greater than the threshold, then it is determined that image 501 contains at least one obituary. In some embodiments, page-based identification ML model 504 is a neural network, such as a convolutional neural network. One purpose of page-based identification ML model 504 is to filter out pages that do not contain obituaries from being processed by the later steps in the pipeline, thereby reducing processing time and cost.

In some embodiments, system 500 includes a segmentation ML model 506 for segmenting image 501 into multiple sections, with each section possibly containing a different obituary. In some embodiments, the output of segmentation ML model 506 includes a set of predicted bounding boxes, each corresponding to a single article or heading. In some embodiments, the output of segmentation ML model 506 further includes a probability for each of the sections corresponding to a confidence in the segmentation for that particular section. In some embodiments, the probability may be compared to a threshold. In some embodiments, segmentation ML model 506 treats the segmentation task as an object detection task. In some embodiments, segmentation ML model 506 is a neural network, such as a convolutional neural network. In some embodiments, the words recognized in image 501 that are within each section are identified based on their X- and Y-coordinates.

In some embodiments, system 500 includes a section-based identification ML model 508 for determining whether a particular section of image 501 contains an obituary. In some embodiments, the output of section-based identification ML model 508 is multiple binary outputs (e.g., yes or no), one for each section. In some embodiments, the output is a probability indicating a likelihood that the particular section of image 501 contains an obituary. In some embodiments, the probability may be compared to a threshold. If the probability is greater than the threshold, then it is determined that the particular section of image 501 contains an obituary. In some embodiments, section-based identification ML model 508 is a neural network, such as a convolutional neural network.

In some embodiments, system 500 includes a data extraction pipeline 510, which receives a plurality of words of an obituary 509 as input. In some embodiments, data extraction pipeline 510 includes an entity tagging ML model 512 for assigning an entity tag from a set of entity tags to each of one or more words of the obituary. For example, entity tagging ML model 512 may assign a single or multiple entity tags to each of a few, most, or all of the words of the obituary. Each word may correspond to an entity or a part of an entity. An entity may correspond to one or more words. The entity tags may indicate whether or not the token (e.g., words) are part of an entity. In an embodiment, entity tagging ML model 512 identifies entities based on assigned entity tags to one or more words. In some embodiments, the entity tag may include a relationship component, a category component, as well as an indication whether the token is the first item in that entity. As an example, in reference to FIG. 3, Kenneth George Cannon is a Person entity. The word Cannon is assigned the entity tag "I-PersonSelf" to indicate that it is part of the entity. Entity tagging ML model 512 assigns the tag "PersonSelf" to entity Kenneth George Cannon. In some embodiments, entity tagging ML model 512 is a neural network, such as a convolutional neural network.

Optionally, in some embodiments, system 500 includes a relationship extraction model 522 for classifying relationships between each of the entities, which may be used to establish the relationship component of the entity tags. For example, for pairs of entities identified by entity tagging ML model 512, relationship extraction model 522 can classify each pair as either having a relationship from a plurality of relationships, or as not having one of the relationships. Classification may be performed using methods including logistic regression, support vector machines, or a ML based method such as a convolutional neural network (CNN), recurrent neural network (RNN), or the like. As an example, consider that three persons "Person1", "Person2", and "Person3" have been tagged in a certain article. "Person1" is the daughter of "Person2" and "Person3", who are married. Consider that there are two possible relationships that relationship extraction model 522 is interested in extracting, "ChildOf" and "SpouseOf". For each ordered pair of Persons, relationship extraction model 522 would classify the relationship as "ChildOf", "SpouseOf", or "None". The result in this example would be:
"Person1"-"Person2": "ChildOf"
"Person1"-"Person3": "ChildOf"
"Person2"-"Person1": "None"
"Person2"-"Person3": "SpouseOf"
"Person3"-"Person1": "None"
"Person3"-"Person2": "SpouseOf"

In some embodiments, relationship extraction model 522 can classify relationships between entities for other entity types, i.e., for entities having category components other than "Person", such as "Place", "Date", and "Age". In some embodiments, relationship extraction model 522 can classify relationships between entities of two different entity types. As one example, the relationship between the entities "Date1" and "Person1" may be classified as "Date1"-- "Person1": "BirthDateOf"

In some embodiments, system 500 includes a gender prediction ML model 514 for predicting a gender for each the words of the obituary that correspond to a name of a person. In some embodiments, a gender is predicted for each of the words for which the category component of the entity tag that was assigned is "Person". In some embodiments, gender prediction ML model 514 is a neural network, such as a convolutional neural network.

In some embodiments, system 500 includes a name assignment ML model 516 for assignment a name part tag from a set of name part tags to each the words of the obituary that correspond to a name of a person. In some embodiments, a name tag part is assigned to each of the words for which the category component of the entity tag that was assigned is "Person". In some embodiments, name assignment ML model 516 is a neural network, such as a convolutional neural network.

In some embodiments, system 500 includes a data synthesizer 518 for summarizing and synthesizing the data generated by data extraction pipeline 510. In some embodiments, facts or data that are redundant, conflicting, or missing information are resolved. For example, multiple versions of a fact may be present. As an example, the deceased individual's given name may be found in multiple versions, such as Richard, Dick, Pops, Lefty, etc. Versions may also include typos due to optical character recognition errors. Other facts such as the place of death of the deceased individual may be extracted more than once (e.g., "California" and "Sonoma" being found in different parts of an article). Data synthesizer 518 may synthesize all facts and data extracted from an obituary and package them into a format that can be used for database queries of a genealogical database 520. Data synthesizer 518 can also perform some inferences in which missing information is supplied from publication metadata. For example, some obituaries may not include the year of death, which can be inferred to be the year of publication of the article. Data extracted from the obituary can then be stored in a genealogical database 520, possibly in conjunction with the obituary itself.

FIGS. 6A-6F illustrate example training steps for training the ML models of system 500, according to some embodiments of the present disclosure. The ML models may be trained sequentially in the illustrated order so as to improve the functionality of each individual ML model.

Figure 6A:
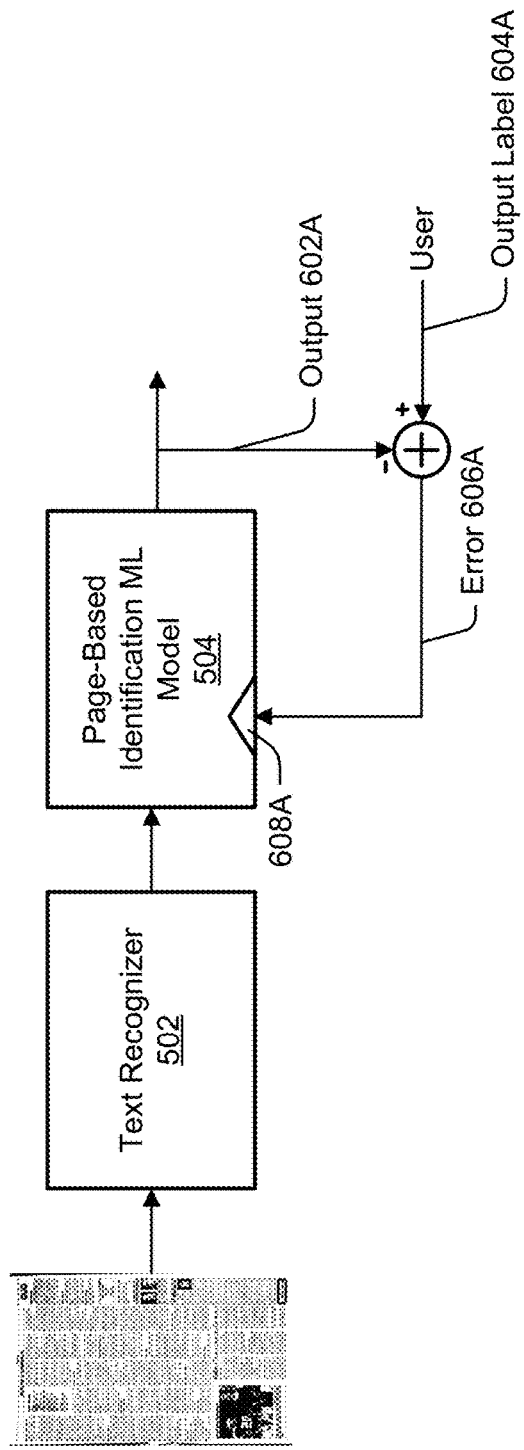
FIGS. 6A-6F illustrate example training steps for training ML models.

FIG. 6A illustrates a diagram showing an example training phase of page-based identification ML model 504. During the training phase, an output 602A indicating whether an input image contains at least one obituary is generated. A user may examine the input image and create an output label 604A through a computer interface indicating whether the user believes that the input image contains at least one obituary. Output 602A is compared to output label 604A to generate an error 606A, which may represent the difference between output 602A and output label 604A. In some instances, page-based identification ML model 504 is then modified by a modifier 608A based on error 606A. Modifier 608A may change weights associated with page-based identification ML model 504 such that output 602A better approximates output label 604A during a subsequent inference. This process is then repeated for multiple input images and user-provided labels.

Figure 6B:
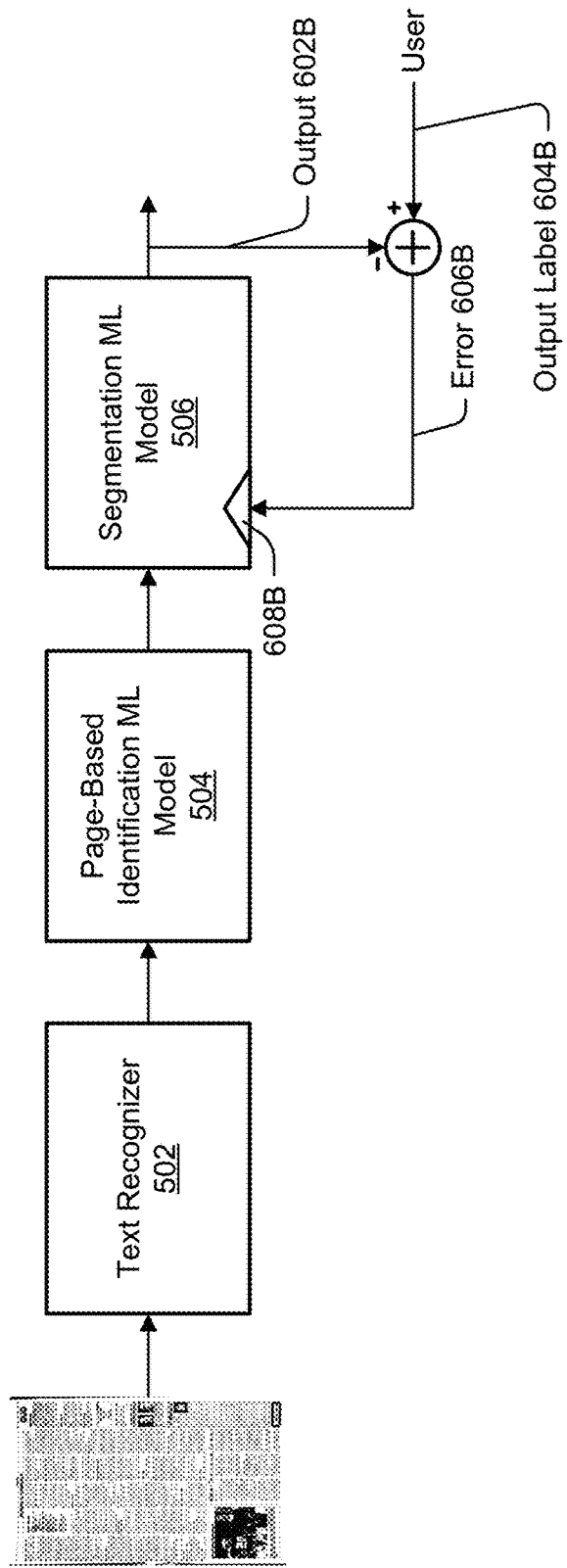

FIG. 6B illustrates a diagram showing an example training phase of segmentation ML model 506. During the training phase, an output 602B including a segmentation of an input image into a plurality of sections is generated. A user may examine the input image and create an output label 604B through a computer interface that includes a plurality of user-provided sections. For example, the user may draw bounding boxes within the input image at locations where the user believes a section to exist. Output 602B is compared to output label 604B to generate an error 606B, which may represent the difference between output 602B and output label 604B, such as a difference in the number of sections and/or a difference in the text encompassed by individual sections. In some instances, segmentation ML model 506 is then modified by a modifier 608B based on error 606B. Modifier 608B may change weights associated with segmentation ML model 506 such that output 602B better approximates output label 604B during a subsequent inference. This process is then repeated for multiple input images and user-provided labels.

Figure 6C:
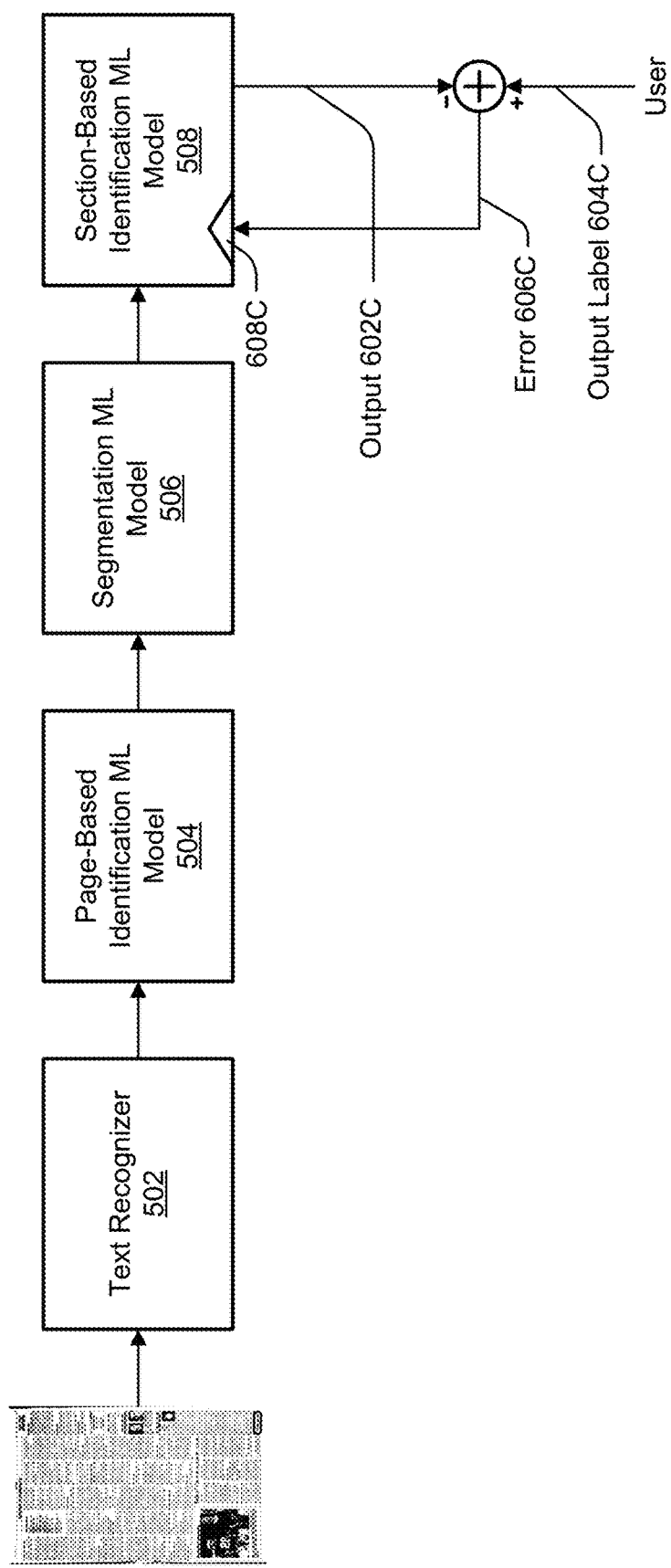

FIG. 6C illustrates a diagram showing an example training phase of section-based identification ML model 508. During the training phase, an output 602C indicating whether an input section of an input image contains an obituary is generated. A user may examine the input section and create an output label 604C through a computer interface indicating whether the user believes that the input section contains an obituary. Output 602C is compared to output label 604C to generate an error 606C, which may represent the difference between output 602C and output label 604C. In some instances, section-based identification ML model 508 is then modified by a modifier 608C based on error 606C. Modifier 608C may change weights associated with section-based identification ML model 508 such that output 602C better approximates output label 604C during a subsequent inference. This process is then repeated for multiple input sections and user-provided labels.

Figure 6D:
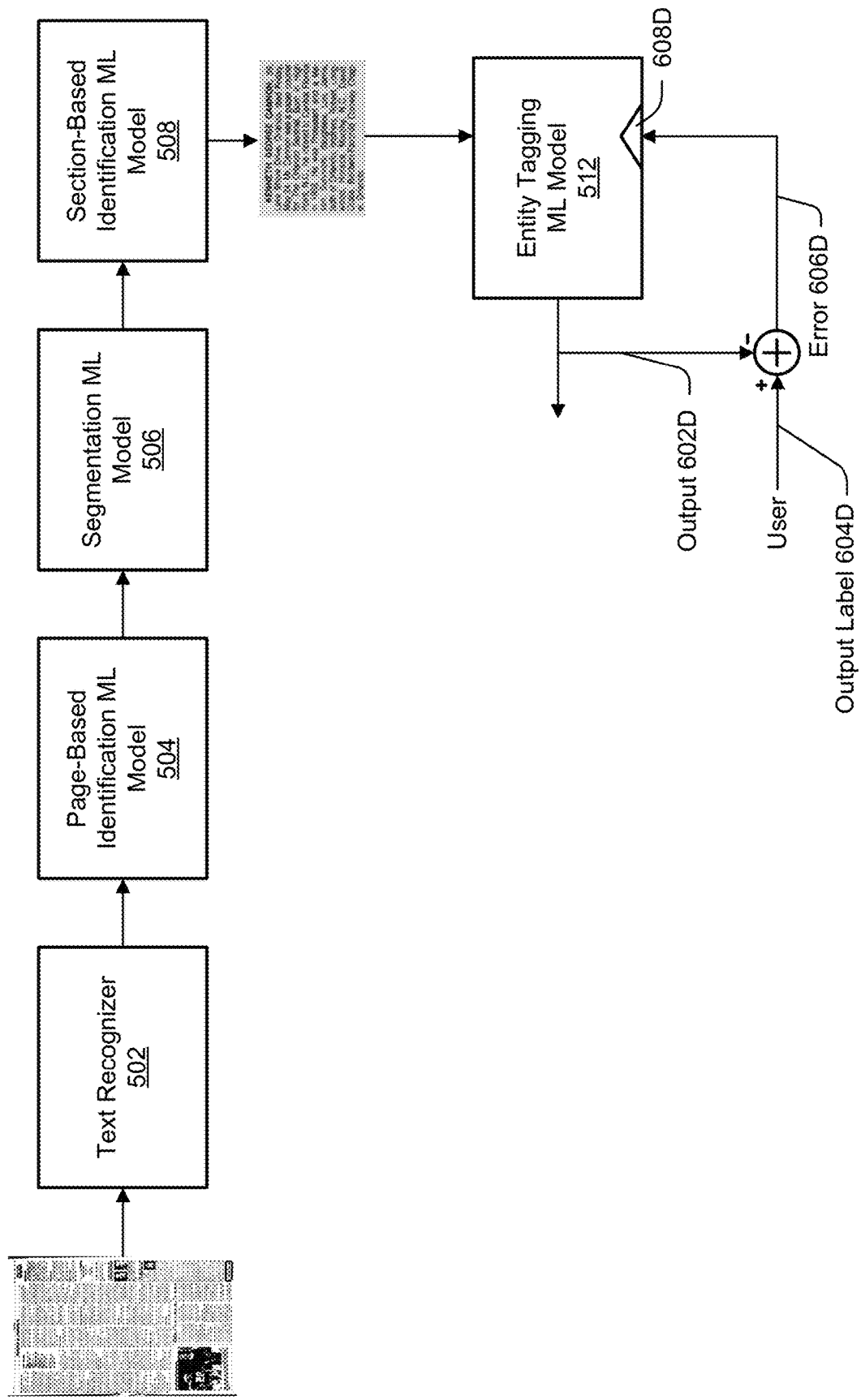

FIG. 6D illustrates a diagram showing an example training phase of entity tagging ML model 512. During the training phase, an output 602D including one or more entity tag assignments to input words of an input obituary are generated. The obituary may be text recognized from a newspaper, as well as text scraped from the web. A user may examine the input words of the input obituary and create an output label 604D through a computer interface including user-provided entity tags. For examine, the user may believe that a particular input word corresponds to the deceased individual's name and may accordingly assign the entity tag "PersonSelf" to the word. Output 602D is compared to output label 604D to generate an error 606D, which may represent the difference between output 602D and output label 604D. In some instances, entity tagging ML model 512 is then modified by a modifier 608D based on error 606D. Modifier 608D may change weights associated with entity tagging ML model 512 such that output 602D better approximates output label 604D during a subsequent inference. This process is then repeated for multiple input obituaries and user-provided labels.

In some embodiments, entity tagging ML model 512 is trained using input words of an input document. In such embodiments, a user may examine the input words of the input document and create output label 604D. For examine, the user may believe that a particular input word corresponds to the individual to whom the document pertains, and may accordingly assign the entity tag "PersonSelf" to the word.

Figure 6E:
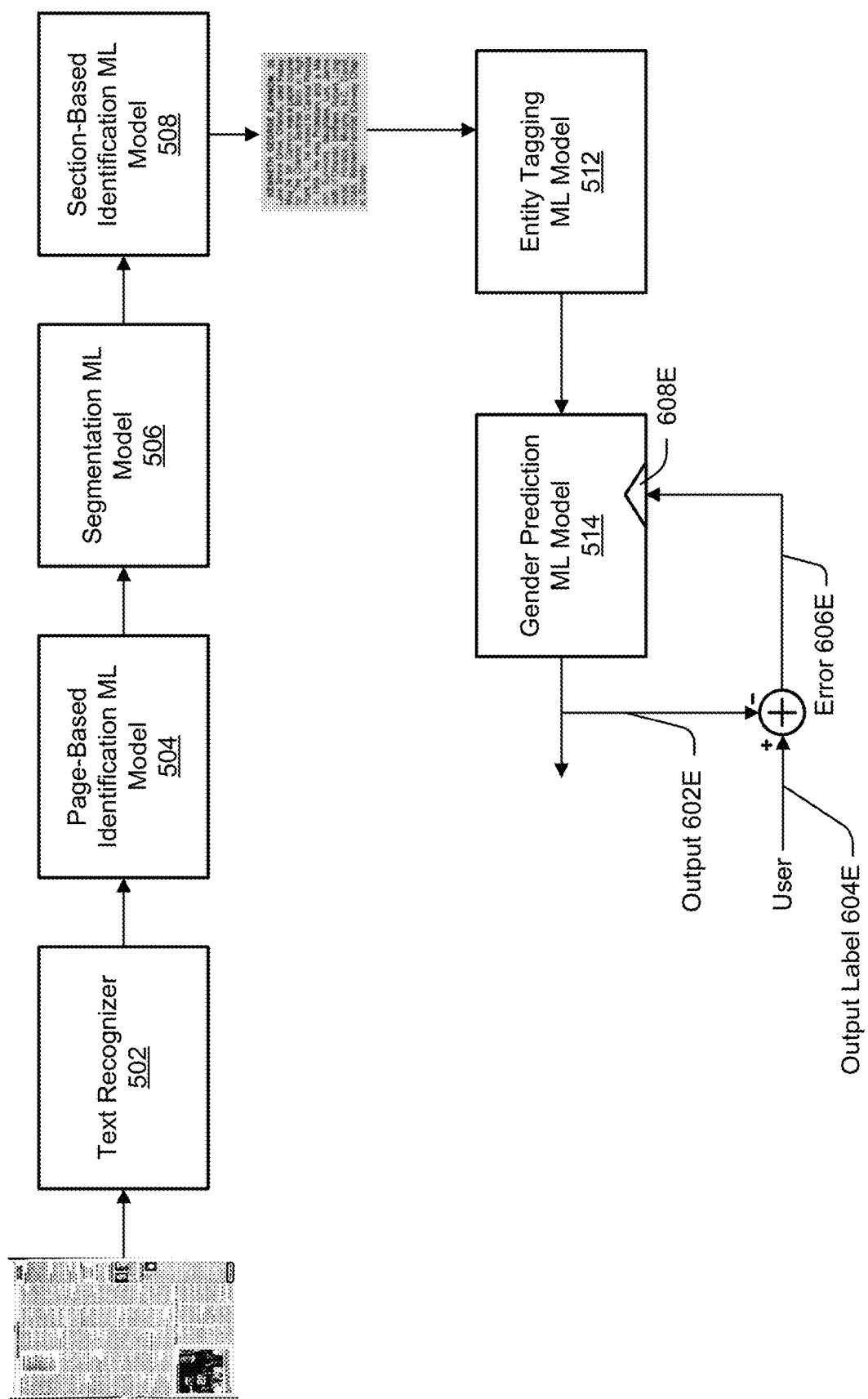

FIG. 6E illustrates a diagram showing an example training phase of gender prediction ML model 514. During the training phase, an output 602E indicating predicted genders for input words of an input obituary is generated. A user may examine the input words and create an output label 604E through a computer interface including user-provided genders. Output 602E is compared to output label 604E to generate an error 606E, which may represent the difference between output 602E and output label 604E. In some instances, gender prediction ML model 514 is then modified by a modifier 608E based on error 606E. Modifier 608E may change weights associated with gender prediction ML model 514 such that output 602E better approximates output label 604E during a subsequent inference. This process is then repeated for multiple input words and user-provided labels. In some embodiments, gender prediction ML model 514 is trained using input words of an input document.

Figure 6F:
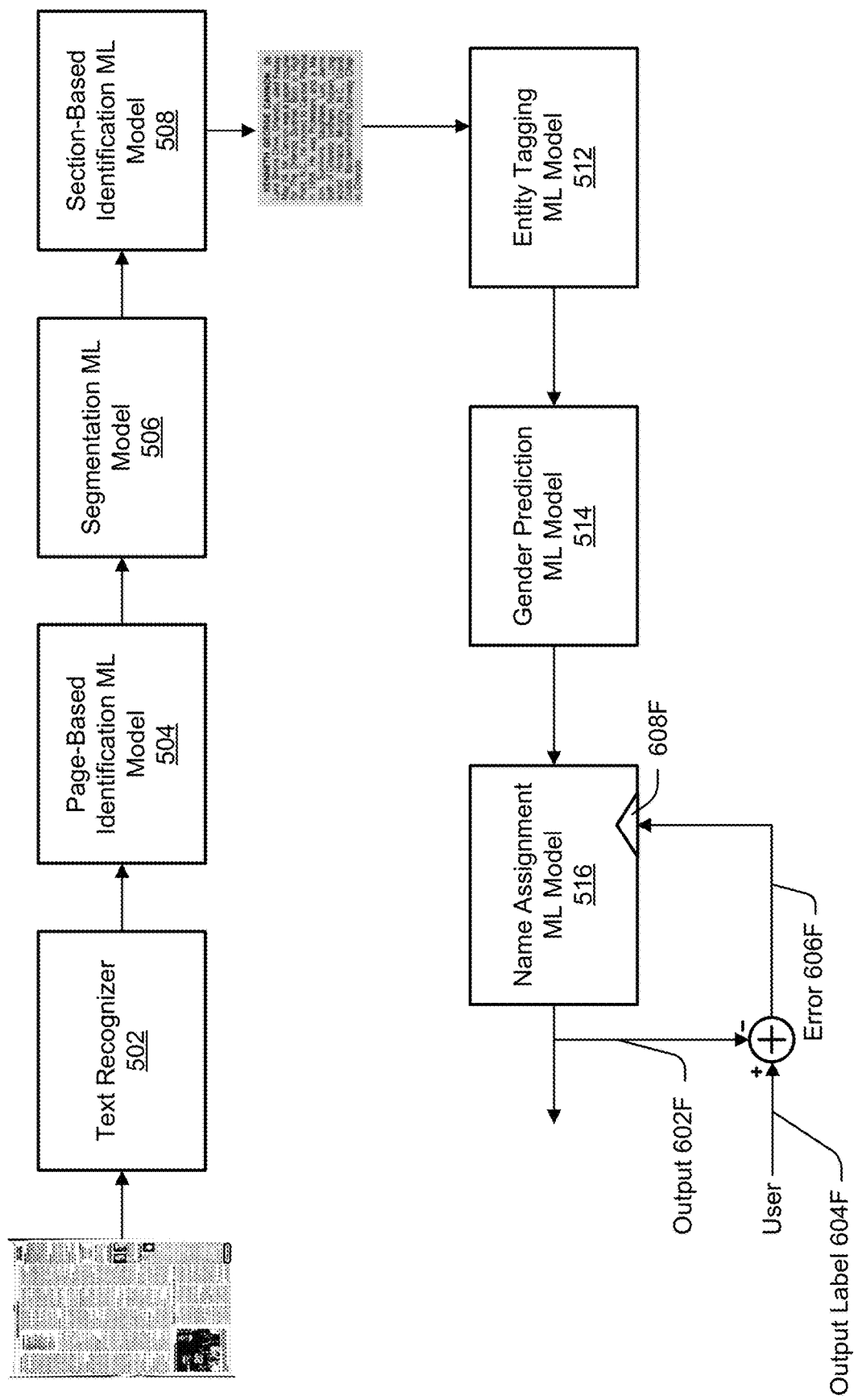

FIG. 6F illustrates a diagram showing an example training phase of name assignment ML model 516. During the training phase, an output 602F including one or more name part tag assignments to input words of an input obituary are generated. A user may examine the input words and create an output label 604F through a computer interface including user-provided name part tags. Output 602F is compared to output label 604F to generate an error 606F, which may represent the difference between output 602F and output label 604F. In some instances, name assignment ML model 516 is then modified by a modifier 608F based on error 606F. Modifier 608F may change weights associated with name assignment ML model 516 such that output 602F better approximates output label 604F during a subsequent inference. This process is then repeated for multiple input words and user-provided labels. In some embodiments, name assignment ML model 516 is trained using input words of an input document.

Figure 7:
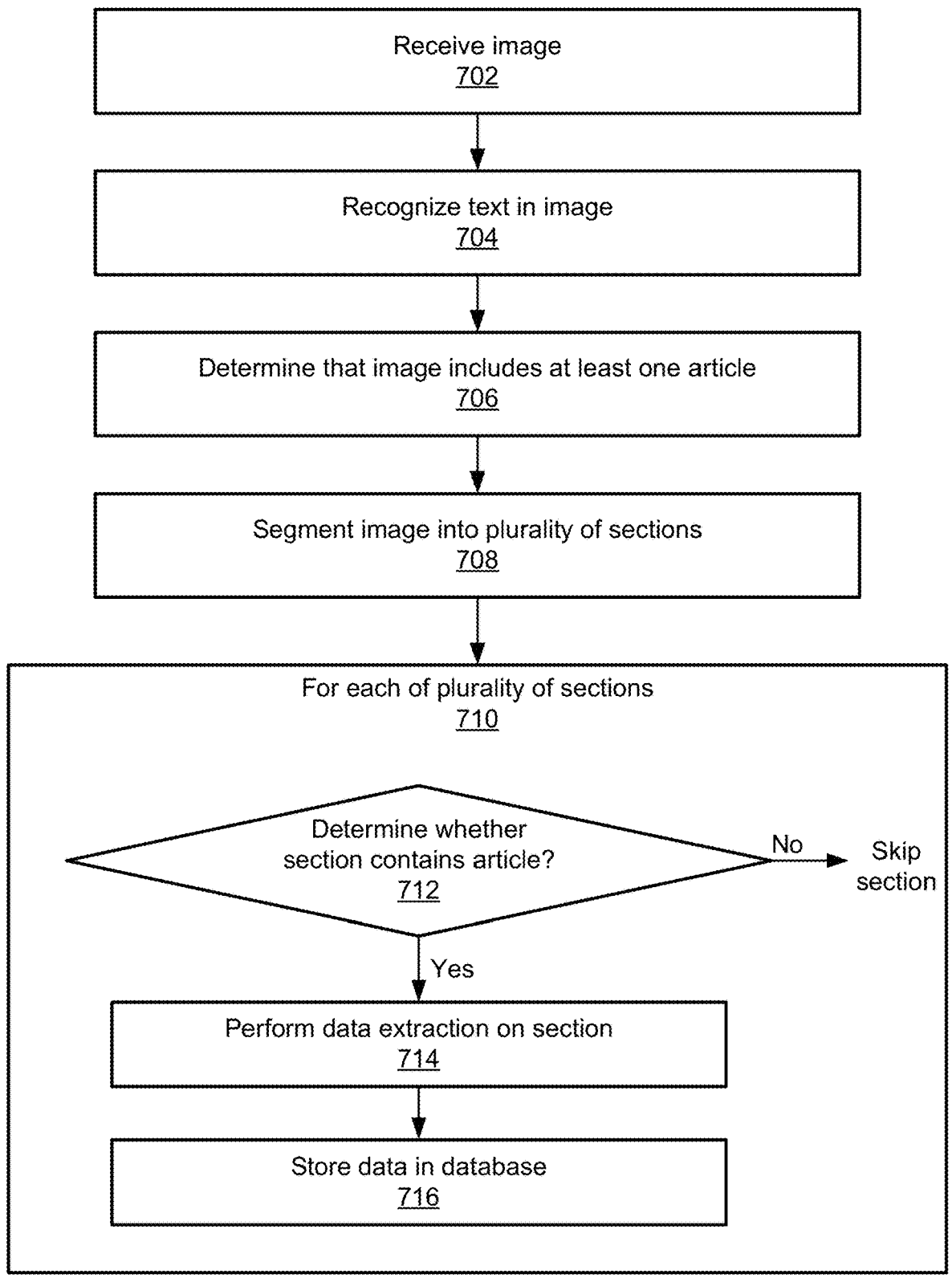
FIG. 7 illustrates an example method for extracting data from obituaries.

FIG. 7 illustrates an example method 700 for extracting data from articles, according to some embodiments of the present disclosure. One or more steps of method 700 may be performed in an order different than that shown in FIG. 7, and one or more steps of method 700 may be omitted during performance of method 700. In some embodiments, method 700 may be a method for extracting data from obituaries or wedding announcements, among other possibilities.

At step 702, an image (e.g., images 102, 202, 302, 501) is received. In some embodiments, the image is received by a system (e.g., system 500).

At step 704, text in the image is recognized. In some embodiments, the text in the image is recognized by a text recognizer (e.g., text recognizer 502).

At step 706, it is determined that the image includes at least one article, such as an obituary (e.g., obituary 306) or a wedding announcement, among other possibilities. In some embodiments, method 700 includes determining whether the image includes at least one article. If it is determined that the image includes at least one article, then method 700 proceeds to step 708. In some embodiments, an ML model (e.g., page-based identification model 504) is used to determine that the image includes at least one article.

At step 708, the image is segmented into a plurality of sections (e.g., sections 204, 304). In some embodiments, an ML model (e.g., segmentation ML model 506) is used to segment the image into a plurality of sections.

At step 710, a number of steps are performed for each of the plurality of sections. In some embodiments, step 712 and possibly steps 714 and 716 are performed for each of the plurality of sections.

At step 712, it is determined whether a section contains an article, such as an obituary (e.g., obituary 306) or a wedding announcement, among other possibilities. If is determined that the section does not contain an article, such as an obituary or a wedding announcement, then that section is skipped and step 712 is performed for the next section. If it is determined that the section contains an article, such as an obituary or a wedding announcement, then method 700 proceeds to step 714. In some embodiments, an ML model (e.g., section-based identification ML model 508) is used to determine whether the section contains an article.

At step 714, data extraction is performed on the section. In some embodiments, performing step 714 includes performing one or more steps of method 800.

At step 716, the data extracted from the section is stored in a database (e.g., genealogical database 520).

Figure 8:
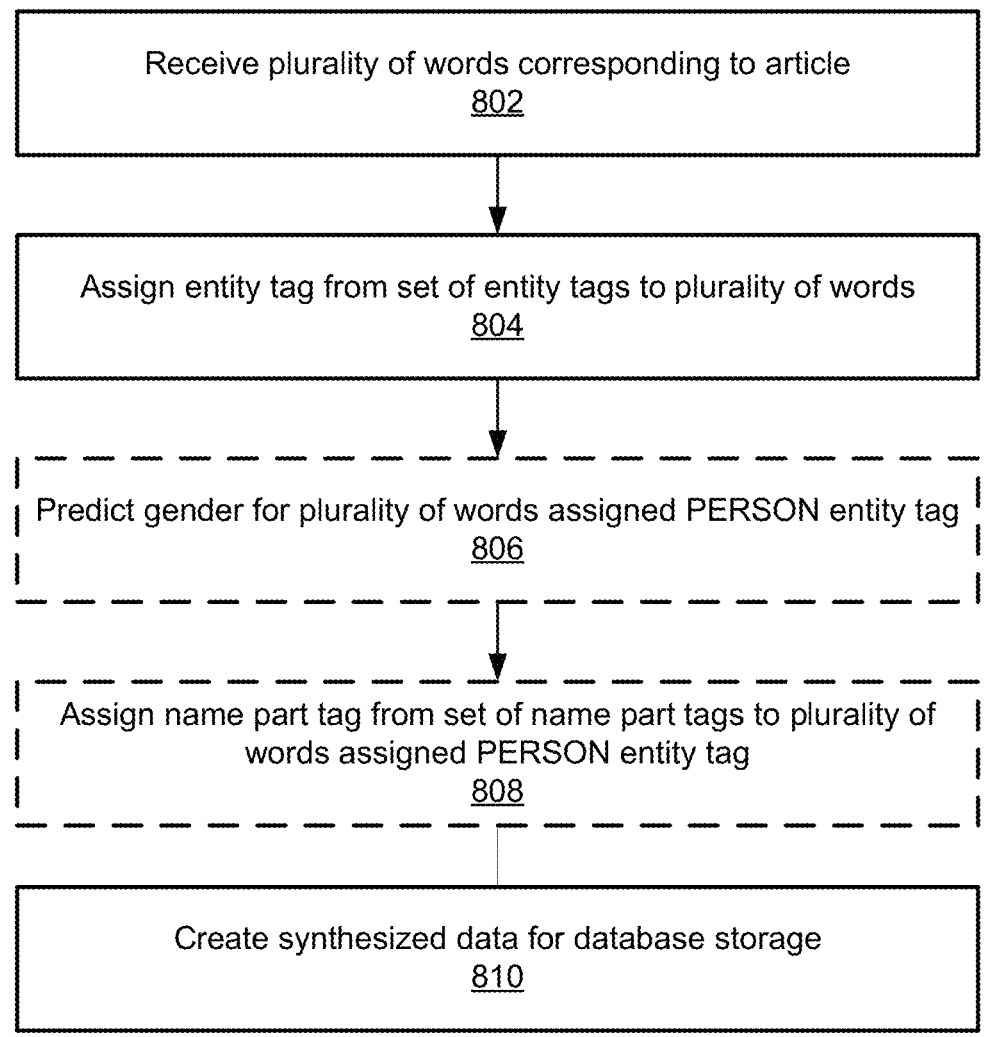
FIG. 8 illustrates an example method for extracting data from obituaries.

FIG. 8 illustrates an example method 800 for extracting data from articles, according to some embodiments of the present disclosure. One or more steps of method 800 may be performed in an order different than that shown in FIG. 8, and one or more steps of method 800 may be omitted during performance of method 800. In some embodiments, method 800 may be a method for extracting data from obituaries or wedding announcements, among other possibilities.

At step 802, a plurality of words (e.g., words 308) corresponding to an input article are received. The input article may be an obituary (e.g., obituaries 306, 509) or a marriage announcement, among other possibilities. In some embodiments, the obituary corresponds to a deceased individual. In some embodiments, the plurality of words are received by a data extraction pipeline (e.g., data extraction pipeline 510).

At step 804, an entity tag from a set of entity tags (e.g., entity tags 310, 400) is assigned to each of one or more words of the plurality of words. In some embodiments, each particular entity tag from the set of entity tags includes a relationship component and a category component. In some embodiments, the relationship component indicates a relationship between a particular word of the plurality of words to which the particular entity tag is assigned and a reference individual, such as the deceased individual. In some embodiments, the category component indicates a categorization of the particular word to a particular category from a set of categories. In some embodiments, the entity tag is assigned by an ML model (e.g., entity tagging ML model 512). In some embodiments, the relationship component indicates a relationship between the particular word and an individual to whom a document pertains. In some embodiments, the set of entity tags is dependent on the type of the input article. For example, the set of entity tags may be different for an obituary (e.g., entity tags 400A) than for a wedding announcement (e.g., entity tags 400B). In such embodiments, the type of the input article may be determined and the set of entity tags may be selected (or filtered/reduced) based on the article type.

At step 806, a gender is optionally predicted for each of the plurality of words. In some embodiments, a gender is predicted for each of the plurality of words for which the category component of the particular entity tag that is assigned is "Person". In some embodiments, predicting a gender for a word includes assigning a gender tag (e.g., gender tags 312) to the word. In some embodiments, the gender is predicted by an ML model (e.g., gender prediction ML model 514).

At step 808, a name part tag (e.g., name part tags 314) from a set of name part tags is optionally assigned to each of the plurality of words. In some embodiments, a name part tag from a set of name part tags is assigned to each of the plurality of words for which the category component of the particular entity tag that is assigned is "Person". In some embodiments, the name part tag is assigned by an ML model (e.g., name assignment ML model 516)

At step 810, synthesized data (e.g., synthesized data 316) is created for database storage. In some embodiments, creating the synthesized data includes summarizing and/or synthesizing the extracted data. In some embodiments, the synthesized data is created by a data synthesizer (e.g., data synthesizer 518).

Figure 9:
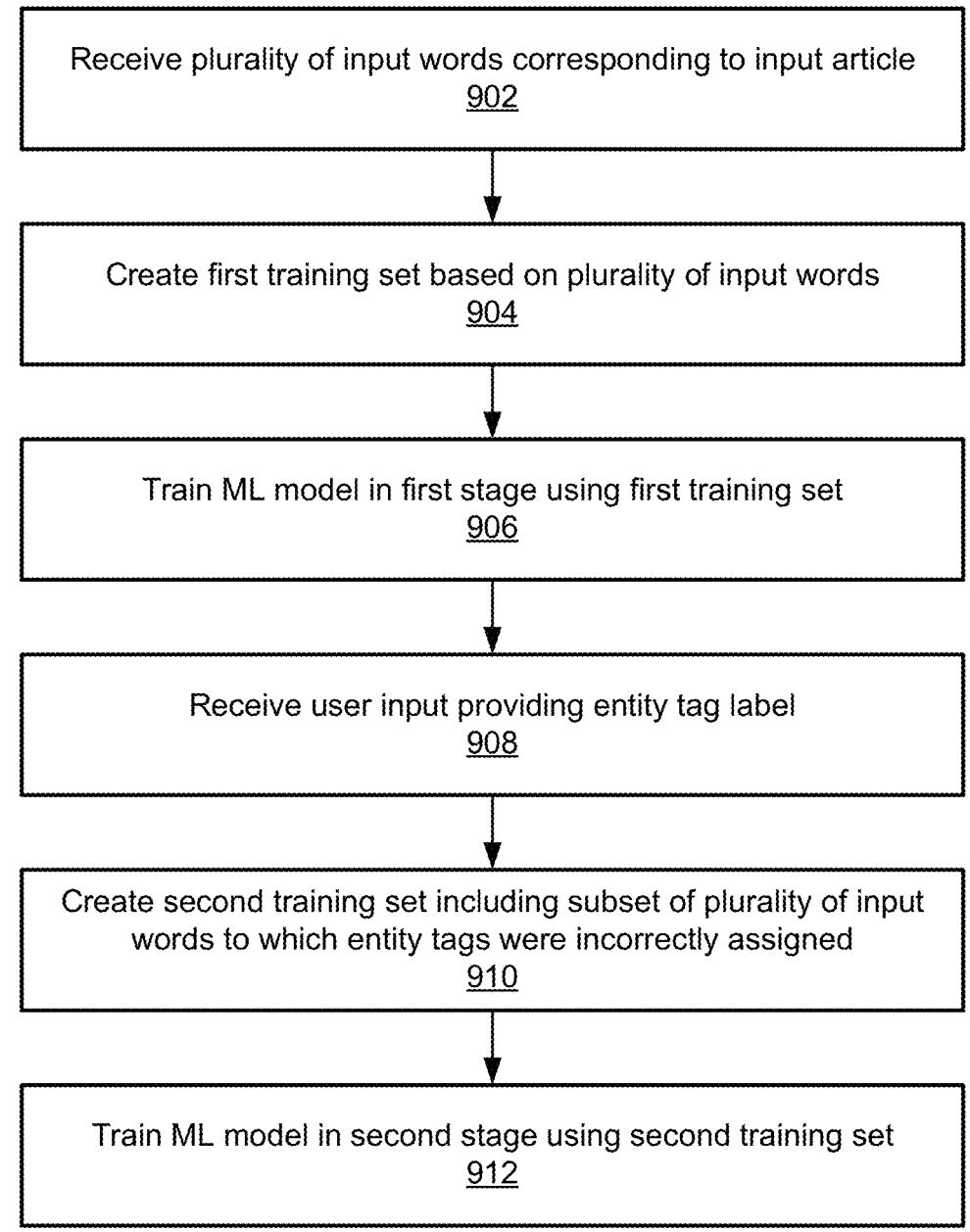
FIG. 9 illustrates an example method for training an ML model.

FIG. 9 illustrates an example method 900 for training an ML model (e.g., entity tagging ML model 512), according to some embodiments of the present disclosure. In some embodiments, the ML model is a neural network, such as a convolutional neural network. One or more steps of method 900 may be performed in an order different than that shown in FIG. 9, and one or more steps of method 900 may be omitted during performance of method 900.

At step 902, a plurality of input words (e.g., words 308) corresponding to an input article are received. The input article may be an obituary (e.g., obituaries 306, 509) or a marriage announcement, among other possibilities.

At step 904, a first training set is created based on the plurality of input words. In some embodiments, the first training set may include the plurality of input words.

At step 906, the ML model is trained in a first stage using the first training set. In some embodiments, training the ML model in the first stage includes assigning, using the ML model, an entity tag (e.g., entity tags 310) from a set of entity tags (e.g., entity tags 400) to each of one or more words of the plurality of input words.

At step 908, user input providing an entity tag label is received. In some embodiments, a user may provide the user input through a computer interface. In some embodiments, the user may examine the plurality of input words on a display device and may create an entity tag label from the set of entity tags, which may be treated as ground truth for training purposes.

At step 910, a second training set is created including a subset of the plurality of input words to which entity tags were incorrectly assigned after the first stage. In some embodiments, the second training set includes an error (e.g., error 606) between the entity tag and the entity tag label.

Figure 10:
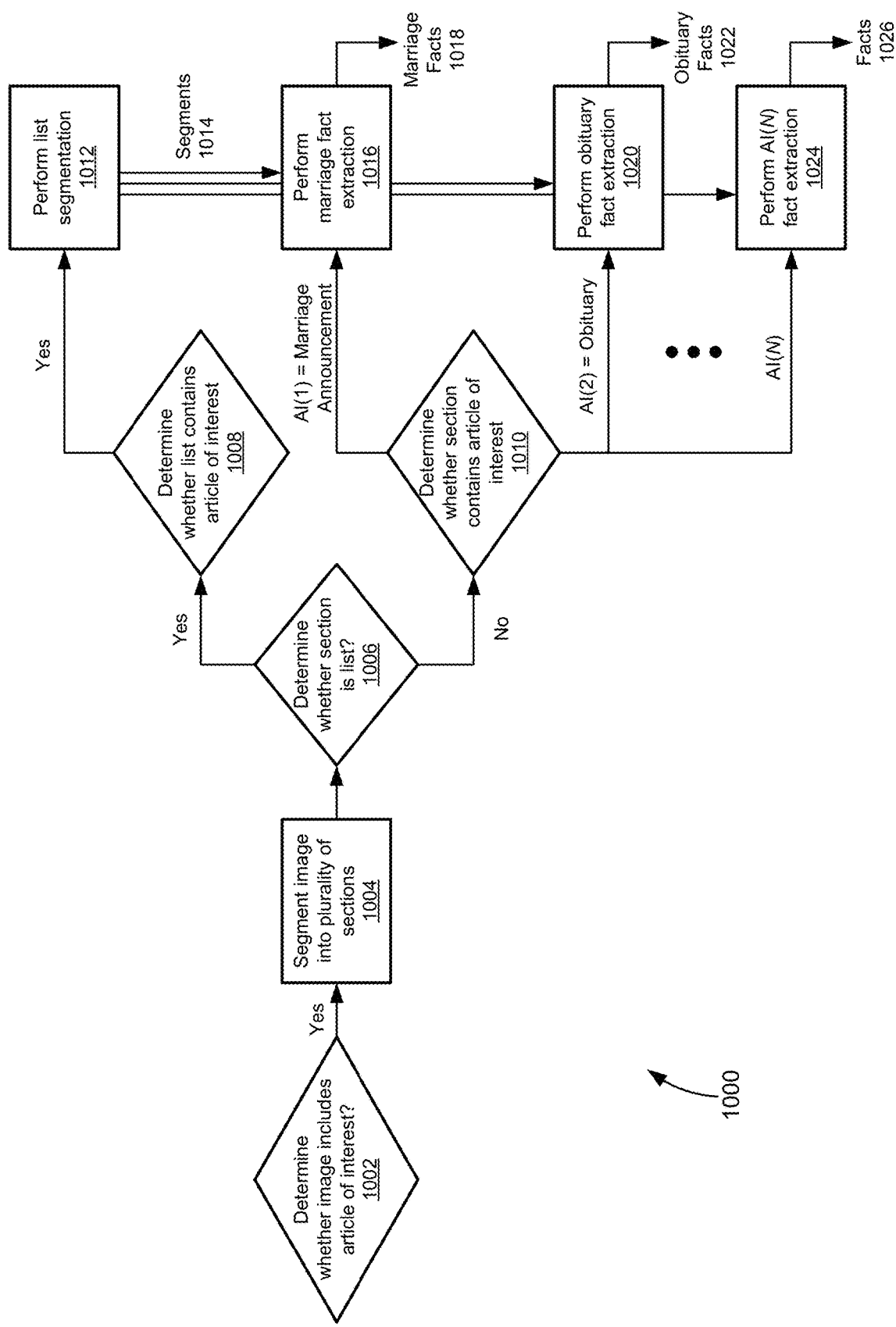
FIG. 10 illustrates an example method for extracting data from articles.

At step 912, the ML model is trained in a second stage using the second training set. In some embodiments, training the ML model in the second stage includes modifying the ML FIG. 10 illustrates an example method 1000 for extracting data from articles, according to some embodiments of the present disclosure. One or more steps of method 1000 may be performed in an order different than that shown in FIG. 10, and one or more steps of method 1000 may be omitted during performance of method 1000. In some embodiments, method 1000 may be a method for extracting data from obituaries or wedding announcements, among other possibilities. One or more steps of method 1000 may be performed in conjunction with one or more steps of any of the methods described herein.

At step 1002, it is determined whether an image (e.g., images 102, 202, 302, 501) contains an article of interest. The article of interest may one or more of various article types, such as an obituary and/or a marriage announcement. For example, it may be determined whether the image includes at least one obituary or at least one marriage announcement. In some embodiments, the image is received by a system (e.g., system 500). If it is determined that the image contains an article of interest, then method 1000 proceeds to step 1004.

At step 1004, the image is segmented into a plurality of sections (e.g., sections 204, 304). In some embodiments, an ML model (e.g., segmentation ML model 506) is used to segment the image into a plurality of sections. The remaining steps of method 1000 may be performed for each section of the plurality of sections.

At step 1006, it is determined whether a section of the plurality of sections is a list. If it is determined that the section is a list, then method 1000 proceeds to step 1008. If it is determined that the section is not a list, then method 1000 proceeds to step 1010.

At step 1008, it is determined whether the list contains an article of interest, such as an obituary or a marriage announcement. If it is determined that the list contains an article of interest, then method 1000 proceeds to step 1012. If it is determined that the list does not contain article of interest, then method 1000 returns to step 1006 for the next section of the plurality of sections.

At step 1010, it is determined whether the section contains an article of interest, such as an obituary or a marriage announcement. Alternatively or additionally, it may be determined which article of interest the section includes. If it is determined that the section contains a marriage announcement (which may be referred to as a first article of interest, or "AI(1)"), then method 1000 proceeds to step 1016. If it is determined that the section contains an obituary (which may be referred to as a second article of interest, or "AI(2)"), then method 1000 proceeds to step 1020. If it is determined that the section contains an $N^{th}$ article of interest, or "AI(N)", then method 1000 proceeds to step 1024.

At step 1012, a list segmentation is performed to produce segments 1014. In some embodiments, each of segments 1014 may include extractable data similar to an obituary or a marriage announcement as described herein. Segments 1014 may be used at steps 1016, 1020, or 1024, depending on which article of interest segments 1014 include.

At step 1016, fact extraction is performed on one or more marriage announcements to produce marriage facts 1018. In some embodiments, performing step 1016 includes performing one or more steps of method 800. For example, marriage facts 1018 may include one or more entity tags (e.g., entity tags 310, 400), gender tags (e.g., gender tags 312), and/or name part tags (e.g., name part tags 314) assigned to one or more words of a marriage announcement.

At step 1018, fact extraction is performed on one or more obituaries to produce obituary facts 1022. In some embodiments, performing step 1020 includes performing one or more steps of method 800. For example, obituary facts 1022 may include one or more entity tags (e.g., entity tags 310, 400), gender tags (e.g., gender tags 312), and/or name part tags (e.g., name part tags 314) assigned to one or more words of an obituary.

At step 1024, fact extraction is performed on one or more articles to produce facts 1026. In some embodiments, performing step 1024 includes performing one or more steps of method 800.

Figure 11:
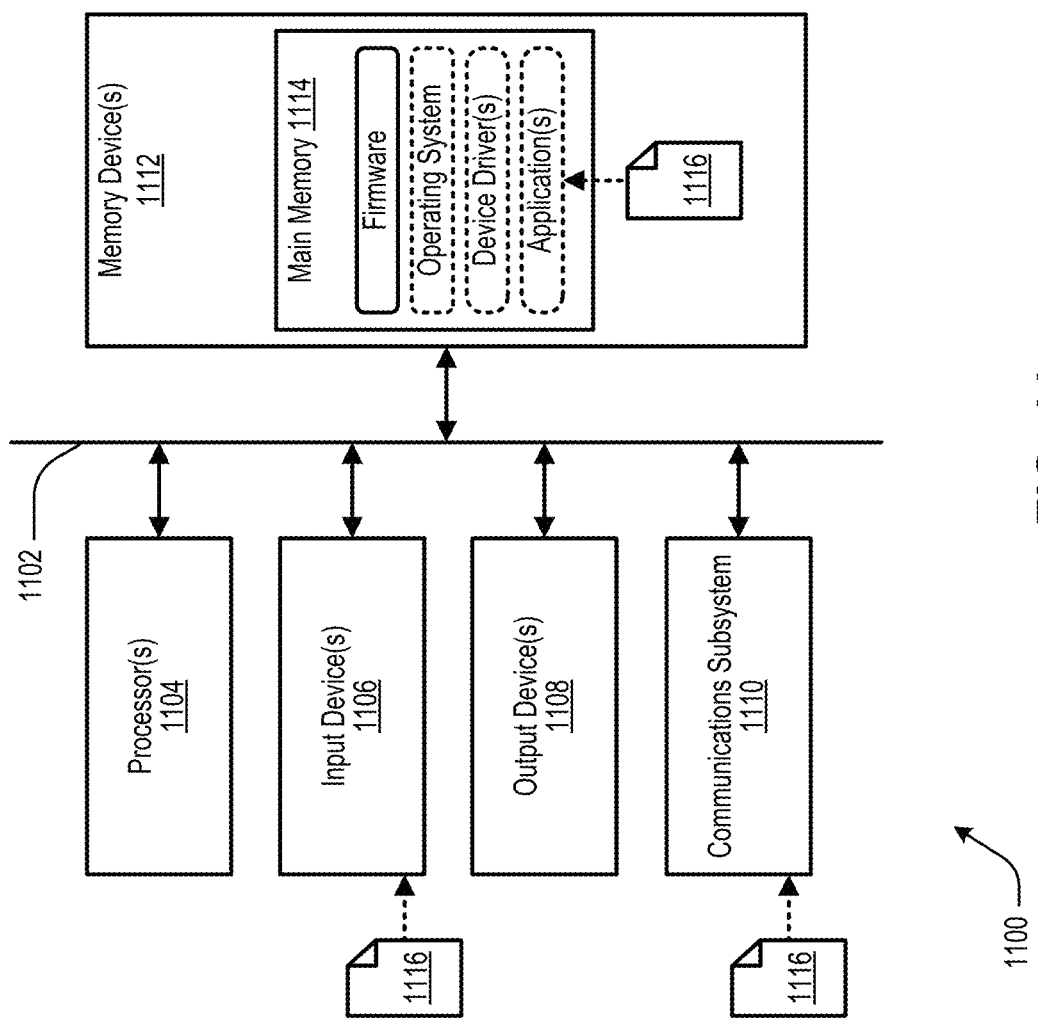
FIG. 11 illustrates an example computer system.

FIG. 11 illustrates an example computer system 1100 comprising various hardware elements, according to some embodiments of the present disclosure. Computer system 1100 may be incorporated into or integrated with devices described herein and/or may be configured to perform some or all of the steps of the methods provided by various embodiments. For example, in various embodiments, computer system 1100 may be incorporated into system 500 and/or may be configured to perform methods 700, 800, 900, and/or 1000. It should be noted that FIG. 11 is meant only to provide a generalized illustration of various components, any or all of which may be utilized as appropriate. FIG. 11, therefore, broadly illustrates how individual system elements may be implemented in a relatively separated or relatively more integrated manner.

In the illustrated example, computer system 1100 includes a communication medium 1102, one or more processor(s) 1104, one or more input device(s) 1106, one or more output device(s) 1108, a communications subsystem 1110, and one or more memory device(s) 1112. Computer system 1100 may be implemented using various hardware implementations and embedded system technologies. For example, one or more elements of computer system 1100 may be implemented as a field-programmable gate array (FPGA), such as those commercially available by XILINX®, INTEL®, or LATTICE SEMICONDUCTOR®, a system-on-a-chip (SoC), an application-specific integrated circuit (ASIC), an application-specific standard product (ASSP), a microcontroller, and/or a hybrid device such as an SoC FPGA, among other possibilities.

The various hardware elements of computer system 1100 may be coupled via communication medium 1102. While communication medium 1102 is illustrated as a single connection for purposes of clarity, it should be understood that communication medium 1102 may include various numbers and types of communication media for transferring data between hardware elements. For example, communication medium 1102 may include one or more wires (e.g., conductive traces, paths, or leads on a printed circuit board (PCB) or integrated circuit (IC), microstrips, striplines, coaxial cables, etc.), one or more optical waveguides (e.g., optical fibers, strip waveguides, etc.), one or more wireless connections or links (e.g., infrared wireless communication, radio communication, microwave wireless communication, etc.), among other possibilities.

In some embodiments, communication medium 1102 may include one or more buses connecting pins of the hardware elements of computer system 1100. For example, communication medium 1102 may include a bus connecting processor(s) 1104 with main memory 1114, referred to as a system bus, and a bus connecting main memory 1114 with input device(s) 1106 or output device(s) 1108, referred to as an expansion bus. The system bus may consist of several elements, including an address bus, a data bus, and a control bus. The address bus may carry a memory address from processor(s) 1104 to the address bus circuitry associated with main memory 1114 in order for the data bus to access and carry the data contained at the memory address back to processor(s) 1104. The control bus may carry commands from processor(s) 1104 and return status signals from main memory 1114. Each bus may include multiple wires for carrying multiple bits of information and each bus may support serial or parallel transmission of data.

Processor(s) 1104 may include one or more central processing units (CPUs), graphics processing units (GPUs), neural network processors or accelerators, digital signal processors (DSPs), and/or the like. A CPU may take the form of a microprocessor, which is fabricated on a single IC chip of metal-oxide-semiconductor field-effect transistor (MOSFET) construction. Processor(s) 1104 may include one or more multi-core processors, in which each core may read and execute program instructions simultaneously with the other cores.

Input device(s) 1106 may include one or more of various user input devices such as a mouse, a keyboard, a microphone, etc., as well as various sensor input devices, such as an image capture device, a pressure sensor (e.g., barometer, tactile sensor, etc.), a temperature sensor (e.g., thermometer, thermocouple, thermistor, etc.), a movement sensor (e.g., accelerometer, gyroscope, tilt sensor, etc.), a light sensor (e.g., photodiode, photodetector, charge-coupled device, etc.), and/or the like. Input device(s) 1106 may also include devices for reading and/or receiving removable storage devices or other removable media. Such removable media may include optical discs (e.g., Blu-ray discs, DVDs, CDs, etc.), memory cards (e.g., CompactFlash card, Secure Digital (SD) card, Memory Stick, etc.), floppy disks, Universal Serial Bus (USB) flash drives, external hard disk drives (HDDs) or solid-state drives (SSDs), and/or the like.

Output device(s) 1108 may include one or more of various devices that convert information into human-readable form, such as without limitation a display device, a speaker, a printer, and/or the like. Output device(s) 1108 may also include devices for writing to removable storage devices or other removable media, such as those described in reference to input device(s) 1106. Output device(s) 1108 may also include various actuators for causing physical movement of one or more components. Such actuators may be hydraulic, pneumatic, electric, etc., and may be provided with control signals by computer system 1100.

Communications subsystem 1110 may include hardware components for connecting computer system 1100 to systems or devices that are located external computer system 1100, such as over a computer network. In various embodiments, communications subsystem 1110 may include a wired communication device coupled to one or more input/output ports (e.g., a universal asynchronous receiver-transmitter (UART), etc.), an optical communication device (e.g., an optical modem, etc.), an infrared communication device, a radio communication device (e.g., a wireless network interface controller, a BLUETOOTH® device, an IEEE 802.11 device, a Wi-Fi device, a Wi-Max device, a cellular device, etc.), among other possibilities.

Memory device(s) 1112 may include the various data storage devices of computer system 1100. For example, memory device(s) 1112 may include various types of computer memory with various response times and capacities, from faster response times and lower capacity memory, such as processor registers and caches (e.g., L0, L1, L2, etc.), to medium response time and medium capacity memory, such as random access memory, to lower response times and lower capacity memory, such as solid state drives and hard drive disks. While processor(s) 1104 and memory device(s) 1112 are illustrated as being separate elements, it should be understood that processor(s) 1104 may include varying levels of on-processor memory such as processor registers and caches that may be utilized by a single processor or shared between multiple processors.

Memory device(s) 1112 may include main memory 1114, which may be directly accessible by processor(s) 1104 via the memory bus of communication medium 1102. For example, processor(s) 1104 may continuously read and execute instructions stored in main memory 1114. As such, various software elements may be loaded into main memory 1114 to be read and executed by processor(s) 1104 as illustrated in FIG. 11. Typically, main memory 1114 is volatile memory, which loses all data when power is turned off and accordingly needs power to preserve stored data. Main memory 1114 may further include a small portion of non-volatile memory containing software (e.g., firmware, such as BIOS) that is used for reading other software stored in memory device(s) 1112 into main memory 1114. In some embodiments, the volatile memory of main memory 1114 is implemented as random-access memory (RAM), such as dynamic RAM (DRAM), and the non-volatile memory of main memory 1114 is implemented as read-only memory (ROM), such as flash memory, erasable programmable read-only memory (EPROM), or electrically erasable programmable read-only memory (EEPROM).

Computer system 1100 may include software elements, shown as being currently located within main memory 1114, which may include an operating system, device driver(s), firmware, compilers, and/or other code, such as one or more application programs, which may include computer programs provided by various embodiments of the present disclosure. Merely by way of example, one or more steps described with respect to any methods discussed above, might be implemented as instructions 1116 executable by computer system 1100. In one example, such instructions 1116 may be received by computer system 1100 using communications subsystem 1110 (e.g., via a wireless or wired signal carrying instructions 1116), carried by communication medium 1102 to memory device(s) 1112, stored within memory device(s) 1112, read into main memory 1114, and executed by processor(s) 1104 to perform one or more steps of the described methods. In another example, instructions 1116 may be received by computer system 1100 using input device(s) 1106 (e.g., via a reader for removable media), carried by communication medium 1102 to memory device(s) 1112, stored within memory device(s) 1112, read into main memory 1114, and executed by processor(s) 1104 to perform one or more steps of the described methods.

In some embodiments of the present disclosure, instructions 1116 are stored on a computer-readable storage medium, or simply computer-readable medium. Such a computer-readable medium may be non-transitory, and may therefore be referred to as a non-transitory computer-readable medium. In some cases, the non-transitory computer-readable medium may be incorporated within computer system 1100. For example, the non-transitory computer-readable medium may be one of memory device(s) 1112, as shown in FIG. 11 with instructions 1116 being stored within memory device(s) 1112. In some cases, the non-transitory computer-readable medium may be separate from computer system 1100. In one example, the non-transitory computer-readable medium may a removable media provided to input device(s) 1106, such as those described in reference to input device(s) 1106, as shown in FIG. 11 with instructions 1116 being provided to input device(s) 1106. In another example, the non-transitory computer-readable medium may a component of a remote electronic device, such as a mobile phone, that may wirelessly transmit a data signal carrying instructions 1116 to computer system 1100 using communications subsystem 1116, as shown in FIG. 11 with instructions 1116 being provided to communications subsystem 1110.

Instructions 1116 may take any suitable form to be read and/or executed by computer system 1100. For example, instructions 1116 may be source code (written in a human-readable programming language such as Java, C, C++, C#, Python, etc.), object code, assembly language, machine code, microcode, executable code, and/or the like. In one example, instructions 1116 are provided to computer system 1100 in the form of source code, and a compiler is used to translate instructions 1116 from source code to machine code, which may then be read into main memory 1114 for execution by processor(s) 1104. As another example, instructions 1116 are provided to computer system 1100 in the form of an executable file with machine code that may immediately be read into main memory 1114 for execution by processor(s) 1104. In various examples, instructions 1116 may be provided to computer system 1100 in encrypted or unencrypted form, compressed or uncompressed form, as an installation package or an initialization for a broader software deployment, among other possibilities.

In one aspect of the present disclosure, a system (e.g., computer system 1100) is provided to perform methods in accordance with various embodiments of the present disclosure. For example, some embodiments may include a system comprising one or more processors (e.g., processor(s) 1104)

that are communicatively coupled to a non-transitory computer-readable medium (e.g., memory device(s) 1112 or main memory 1114). The non-transitory computer-readable medium may have instructions (e.g., instructions 1116) stored therein that, when executed by the one or more processors, cause the one or more processors to perform the methods described in the various embodiments.

In another aspect of the present disclosure, a computer-program product that includes instructions (e.g., instructions 1116) is provided to perform methods in accordance with various embodiments of the present disclosure. The computer-program product may be tangibly embodied in a non-transitory computer-readable medium (e.g., memory device(s) 1112 or main memory 1114). The instructions may be configured to cause one or more processors (e.g., processor(s) 1104) to perform the methods described in the various embodiments.

In another aspect of the present disclosure, a non-transitory computer-readable medium (e.g., memory device(s) 1112 or main memory 1114) is provided. The non-transitory computer-readable medium may have instructions (e.g., instructions 1116) stored therein that, when executed by one or more processors (e.g., processor(s) 1104), cause the one or more processors to perform the methods described in the various embodiments.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes reference to one or more of such users, and reference to "a processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A computer-implemented method for extracting data from obituaries, the method comprising:
    receiving an image;
    recognizing text in the image;
    determining that the image contains at least one obituary;
    segmenting the image into a plurality of sections;
    determining that a section of the plurality of sections contains an obituary of the at least one obituary, the obituary containing a plurality of words and corresponding to a deceased individual; and
    assigning, using an entity tagging machine learning (ML) model, an entity tag from a set of entity tags to each of one or more words of the plurality of words, wherein each particular entity tag from the set of entity tags includes a relationship component and a category component, wherein the relationship component indicates a relationship between a particular word of the plurality of words to which the particular entity tag is assigned and the deceased individual, and wherein the category component indicates a categorization of the particular word to a particular category from a set of categories;
    wherein, prior to assigning the entity tag, the entity tagging ML model is trained by:
        receiving a plurality of input words corresponding to an input obituary;
        creating a first training set based on the plurality of input words;
        training the entity tagging ML model in a first stage using the first training set;
        creating a second training set including a subset of the plurality of input words to which entity tags were incorrectly assigned after the first stage; and
        training the entity tagging ML model in a second stage using the second training set.

2. The computer-implemented method of claim 1, wherein the entity tagging ML model is a neural network.

3. The computer-implemented method of claim 1, wherein the relationship component is selected from the group comprising: SELF, SPOUSE, CHILD, SIBLING, and PARENT.

4. The computer-implemented method of claim 1, wherein the category component is selected from the group comprising: PERSON, PLACE, DATE, and AGE.

5. The computer-implemented method of claim 1, further comprising:
    predicting, using a gender prediction ML model, a gender for each of the plurality of words for which the category component of the particular entity tag that is assigned is PERSON.

6. The computer-implemented method of claim 1, further comprising:

assigning, using a name assignment ML model, a name part tag from a set of name part tags to each of the plurality of words for which the category component of the particular entity tag that is assigned is PERSON, wherein the set of name part tags at least includes GIVEN NAME, SURNAME, and MAIDEN NAME.

7. A computer-implemented method for extracting data from obituaries, the method comprising:

receiving an image;

segmenting the image into a plurality of sections;

determining that a section of the plurality of sections contains an obituary containing a plurality of words, the obituary corresponding to a deceased individual; and assigning, using an entity tagging machine learning (ML) model, an entity tag from a set of entity tags to each of one or more words of the plurality of words, wherein each particular entity tag from the set of entity tags includes a relationship component and a category component, wherein the relationship component indicates a relationship between a particular word of the plurality of words to which the particular entity tag is assigned and the deceased individual, and wherein the category component indicates a categorization of the particular word to a particular category from a set of categories;

wherein, prior to assigning the entity tag, the entity tagging ML model is trained by:

receiving an input obituary containing a plurality of input words;

creating a first training set based on the plurality of input words;

training the entity tagging ML model in a first stage using the first training set;

creating a second training set including a subset of the plurality of input words to which entity tags were incorrectly assigned after the first stage; and training the entity tagging ML model in a second stage using the second training set.

8. The computer-implemented method of claim 7, wherein the entity tagging ML model is a neural network.

9. The computer-implemented method of claim 7, wherein the relationship component is selected from the group comprising: SELF, SPOUSE, CHILD, SIBLING, and PARENT.

10. The computer-implemented method of claim 7, wherein the category component is selected from the group comprising: PERSON, PLACE, DATE, and AGE.

11. The computer-implemented method of claim 7, further comprising:

recognizing text in the image.

12. The computer-implemented method of claim 7, further comprising:

predicting, using a gender prediction ML model, a gender for each of the plurality of words for which the category component of the particular entity tag that is assigned is PERSON.

13. The computer-implemented method of claim 7, further comprising:

assigning, using a name assignment ML model, a name part tag from a set of name part tags to each of the plurality of words for which the category component of the particular entity tag that is assigned is PERSON, wherein the set of name part tags at least includes GIVEN NAME and SURNAME.

14. A non-transitory computer-readable medium comprising instructions that, when executed by one or more processors, cause the one or more processors to perform operations comprising:

receiving an obituary containing a plurality of words, the obituary corresponding to a deceased individual; and assigning, using an entity tagging machine learning (ML) model, an entity tag from a set of entity tags to each of one or more words of the plurality of words, wherein each particular entity tag from the set of entity tags includes a relationship component and a category component, wherein the relationship component indicates a relationship between a particular word of the plurality of words to which the particular entity tag is assigned and the deceased individual, and wherein the category component indicates a categorization of the particular word to a particular category from a set of categories;

wherein, prior to assigning the entity tag, the entity tagging ML model is trained by:

receiving an input obituary containing a plurality of input words;

creating a first training set based on the plurality of input words;

training the entity tagging ML model in a first stage using the first training set;

creating a second training set including a subset of the plurality of input words to which entity tags were incorrectly assigned after the first stage; and training the entity tagging ML model in a second stage using the second training set.

15. The non-transitory computer-readable medium of claim 14, wherein the entity tagging ML model is a neural network.

16. The non-transitory computer-readable medium of claim 14, wherein the relationship component is selected from the group comprising: SELF, SPOUSE, CHILD, SIBLING, and PARENT.

17. The non-transitory computer-readable medium of claim 14, wherein the category component is selected from the group comprising: PERSON, PLACE, DATE, and AGE.

* * * * *